United States Patent
D'Armancourt et al.

(10) Patent No.: US 11,407,253 B2
(45) Date of Patent: Aug. 9, 2022

(54) BICYCLE RIMS AND METHOD OF MANUFACTURE THEREOF

(71) Applicant: FALCON COMPOSITES CORP., Montréal (CA)

(72) Inventors: Alexandre D'Armancourt, Montréal (CA); Julien Brazeau-Séguin, Montréal (CA)

(73) Assignee: FALCON COMPOSITES CORP., Saint-Laurent (CA)

( * ) Notice: Subject to any disclaimer, the term of this patent is extended or adjusted under 35 U.S.C. 154(b) by 0 days.

(21) Appl. No.: 16/771,194

(22) PCT Filed: Dec. 13, 2018

(86) PCT No.: PCT/CA2018/051593
§ 371 (c)(1),
(2) Date: Jun. 9, 2020

(87) PCT Pub. No.: WO2019/113701
PCT Pub. Date: Jun. 20, 2019

(65) Prior Publication Data
US 2020/0369081 A1  Nov. 26, 2020

Related U.S. Application Data

(60) Provisional application No. 62/598,442, filed on Dec. 13, 2017.

(51) Int. Cl.
| | | |
|---|---|---|
| *B29C 70/08* | (2006.01) | |
| *B60B 21/06* | (2006.01) | |
| *B60B 21/02* | (2006.01) | |
| *B29C 70/34* | (2006.01) | |

(Continued)

(52) U.S. Cl.
CPC .......... *B60B 21/062* (2013.01); *B29C 70/085* (2013.01); *B29C 70/20* (2013.01);
(Continued)

(58) Field of Classification Search
CPC ...... B29C 70/085; B29C 70/222; B29C 70/34
See application file for complete search history.

(56) References Cited

U.S. PATENT DOCUMENTS

| | | | |
|---|---|---|---|
| 4,314,964 A | 2/1982 | Ferrary | |
| 4,983,430 A * | 1/1991 | Sargent | B29C 31/002 |
| | | | 264/258 |

(Continued)

FOREIGN PATENT DOCUMENTS

| | | |
|---|---|---|
| CA | 2465119 | 6/2003 |
| EP | 2492111 | 8/2012 |

OTHER PUBLICATIONS

English Translation—Machine Generated of EP 2 492 111 B1, "Use of a braiding device, method for producing a rim with a separable braiding device and bicycle rim", published on Aug. 29, 2012.

*Primary Examiner* — Matthew J Daniels
(74) *Attorney, Agent, or Firm* — Bereskin & Parr LLP/S.E.N.C.R.L., s.r.l.

(57) ABSTRACT

A method of manufacturing a rim includes placing at least one braided sleeve on a core dimensioned to define a shape of an internal wall of the rim. The method includes inserting the braided sleeves placed on the core, inside a mold that is dimensioned to define a shape of an external wall shape of the rim. The method further includes injecting a resin inside the mold to contact the mold and impregnate the sleeves and other layers with resin. The method also includes curing the resin to form the internal and external walls of the rim and obtain a cured rim having the core connected thereto. The method further includes removing the cured rim and core from the mold and melting the core to get it out of the rim.

18 Claims, 25 Drawing Sheets

(51) Int. Cl.
  B29C 70/48 (2006.01)
  B29C 70/20 (2006.01)
  B29C 70/22 (2006.01)
  B60B 1/00 (2006.01)
  B60B 5/02 (2006.01)
  B29L 31/32 (2006.01)

(52) U.S. Cl.
  CPC ............ B29C 70/222 (2013.01); B29C 70/34 (2013.01); B29C 70/48 (2013.01); B60B 21/025 (2013.01); *B29L 2031/322* (2013.01); *B60B 1/003* (2013.01); *B60B 5/02* (2013.01); *B60B 2900/111* (2013.01); *B60B 2900/311* (2013.01); *B60Y 2200/13* (2013.01)

(56) References Cited

U.S. PATENT DOCUMENTS

| | | | |
|---|---|---|---|
| 5,176,864 A * | 1/1993 | Bates | B29C 33/52 106/38.8 |
| 6,991,300 B2 | 1/2006 | Colegrove | |
| 7,258,402 B2 * | 8/2007 | Meggiolan | B29C 70/446 301/95.103 |
| 7,614,706 B2 | 11/2009 | Meggiolan et al. | |
| 8,002,362 B2 | 8/2011 | Colegrove et al. | |
| 8,070,235 B2 | 12/2011 | Reuteler | |
| 8,882,207 B2 * | 11/2014 | Matsui | B60B 5/02 301/95.103 |
| 9,346,319 B2 | 5/2016 | Schiers | |
| 2004/0021366 A1 | 2/2004 | Colegrove | |
| 2005/0006233 A1 | 1/2005 | Barrett | |
| 2010/0013119 A1 | 1/2010 | Meggiolan et al. | |
| 2012/0062021 A1 | 3/2012 | Lew | |
| 2012/0244302 A1 * | 9/2012 | Hirokawa | B29C 70/32 428/36.3 |
| 2012/0301654 A1 * | 11/2012 | Wetzels | B29C 70/865 428/66.6 |
| 2014/0042798 A1 | 2/2014 | Iwai et al. | |
| 2015/0202828 A1 | 7/2015 | Yu | |
| 2016/0303903 A1 | 10/2016 | Kashimoto et al. | |
| 2018/0207979 A1 | 7/2018 | Iwai et al. | |

* cited by examiner

BICYCLE RIMS AND METHOD OF MANUFACTURE THEREOF

CROSS-REFERENCE TO RELATED APPLICATIONS

The present application is a 35 USC 371 national stage entry of PCT/CA2018/051593 filed on Dec. 13, 2018 and which claims priority to U.S. application No. 62/598,442 filed on Dec. 13, 2017. These documents are hereby incorporated by reference in their entirety.

FIELD OF THE DISCLOSURE

The present subject-matter relates to a rim and method of manufacturing a rim, and more particularly to a method of manufacturing a rim where in the internal wall of the rim is defined by placing at least one braided sleeve on a core.

BACKGROUND OF THE DISCLOSURE

Bicycling is becoming a very popular sport for both amateurs and professionals. Whether the bicycle is used for recreation, transportation or competition, the bicycle industry is constantly improving the various components of the bicycle. One particular component of bicycles, which has been redesigned over the past years, is the bicycle rim.

The rims of a bicycle function as a device to bear the loading and as a device to connect the tires. That makes the rims fundamental and critical components of a bicycle. Thus, the manufacturing process and the materials involved in making rims are key factors in order to achieve the desired rim weight and mechanical strength.

Conventionally, the rim is the outer hoop of a bicycle wheel. Usually, the rim is made of metal. For example, the spokes of a bicycle wheel can extend between a central hub of the wheel and the rim. For example, an inflatable tube and/or tire are usually positioned around the exterior of the rim and air is introduced through a valve mechanism to inflate the tube and/or tire on the rim as a functional part of a bicycle.

Conventional rims are manufactured by bending metallic bars. For example, after the metallic bar is bent to be in a substantially circular shape, two terminals of the bar are then joined together by gluing, welding, an extra bolt element or other joint elements. Thereafter, the metallic circle undergoes a surface treatment and a carbon composite material is then attached on an inner surface of the metallic circle to form a composite rim.

In view of the above, there exists a need for a simple method for manufacturing bicycle rims. There is also a need for lightweight and aerodynamic rims that are simple to manufacture and assemble. This disclosure addresses these needs in the prior art as well as other needs, which will become apparent to those skilled in the art.

SUMMARY OF THE DISCLOSURE

In one aspect, there is disclosed a method of manufacturing a rim, including:
placing at least one braided sleeve on a core dimensioned to define a shape of an internal wall of the rim;
inserting the braided sleeves placed on the core, inside a mold that is dimensioned to define a shape of an external wall shape of the rim;
injecting a resin inside the mold to contact the mold and the sleeves with the resin;
curing the resin to form the internal and external walls of the rim and obtain a cured rim having the core connected thereto;
removing the cured rim and core from the mold; and
melting the core.

In one aspect, a method of manufacturing a rim includes:
placing at least one braided sleeve on a core dimensioned to define a shape of an internal wall of the rim;
inserting the braided sleeves placed on the core, inside a mold that is dimensioned to define a shape of an external wall shape of the rim;
injecting a resin inside the mold to contact the mold and impregnate the at least one braided sleeve with the resin;
curing the resin to form the internal and external walls of the rim and obtain a cured rim having the core connected thereto;
removing the cured rim and core from the mold; and
removing the core.

In one aspect, a method of manufacturing a rim includes:
injecting a resin inside a mold, the mold comprising at least one braided sleeve on a core dimensioned to define a shape of an internal wall of the rim, the mold being dimensioned to define a shape of an external wall shape of the rim, the injecting being carried out to contact the mold and impregnate the at least one braided sleeve with the resin;
curing the resin to form the internal and external walls of the rim and obtain a cured rim having the core connected thereto;
removing the cured rim and core from the mold; and
removing the core.

In one aspect, there is disclosed a bicycle rim comprising an external wall molded in a single piece, wherein the external wall defines a hook dimensioned for holding a bicycle tubeless tire, a clincher tire or a tubular tire.

In one aspect, a bicycle rim includes a first external wall molded in a single unitary continuous piece that defines a portion of the bicycle rim and a second external wall molded in a single unitary continuous piece that defines a hook dimensioned for holding a bicycle tubeless tire, a clincher tire or a tubular tire, said first external wall and said second external wall are connected together.

BRIEF DESCRIPTION OF THE DRAWINGS

For a better understanding of the subject-matter described herein and to show more clearly how it may be carried into effect, reference will now be made, by way of example only, to the accompanying drawings which show exemplary embodiments, and in which.

DETAILED DESCRIPTION OF THE DISCLOSURE

Figure 1:
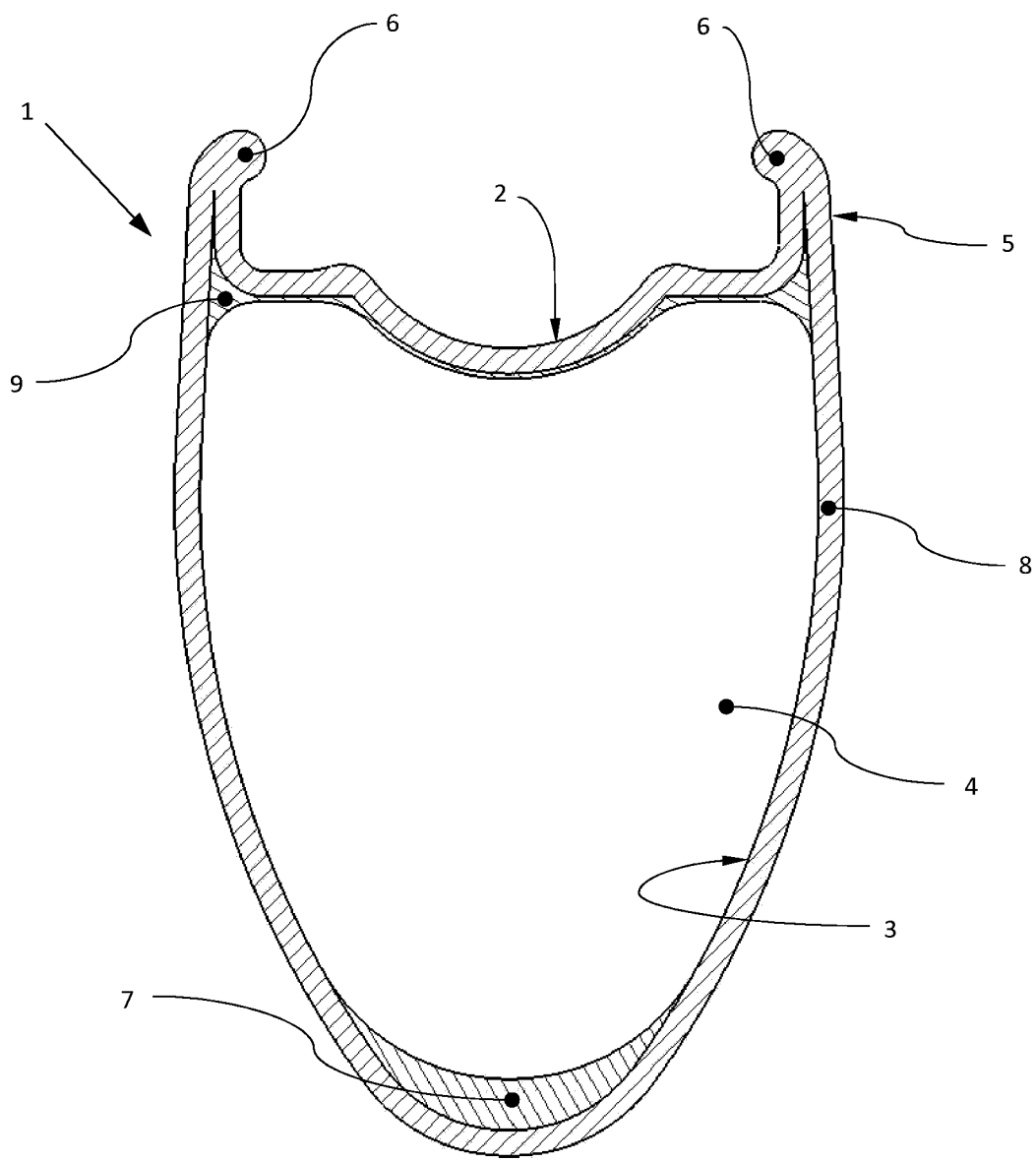
FIG. 1 illustrates a cross section view of a rim according to one example.

Referring to FIGS. 1-4 and 18, there are shown cross section views of rims. The rims can be bicycle rims. The rims can be a part of a bicycle wheel. For example, the rims can be utilized as either a rim for a front bicycle wheel or a rim for a rear bicycle wheel. Accordingly, it will be apparent to those skilled in the art from this disclosure that the description pertaining to the construction of a bicycle rim that can be applied to either a front bicycle wheel or a rear bicycle wheel.

For example, placing at least one braided sleeve on the core includes placing at least one braided sleeve on the core that has at least one reinforcing layer connected thereto so as to sandwich the reinforcing layer between the braided sleeve and the core.

For example, at least one reinforcing layer is disposed on an innermost surface of the core.

For example, at least one reinforcing layer is disposed on an outermost surface of the core.

For example, the core includes two reinforcing layers connected thereto, a first reinforcing layer being disposed on an innermost surface of the core and a second reinforcing layer disposed on an outermost surface of the core.

For example, the method includes connecting the first reinforcing layer to the innermost surface of the core so as to prepare a precursor of a spoke bed; and connecting the second reinforcing layer to the outermost surface of the core so as to prepare a precursor of a rim bed.

For example, at least one reinforcing layer is bonded to the core by an adhesive.

For example, at least one reinforcing layer is maintained on the core by a rope that wraps around the core.

For example, the first reinforcing layer and the second reinforcing layer are bonded to the core by an adhesive.

For example, the first reinforcing layer and the second reinforcing layer are maintained on the core by a rope that wraps around the core.

For example, the rope is made of spandex.

For example, at least one reinforcing layer includes at least one of unidirectional fabrics, woven fabrics, braided reinforcements, folded sleeves, stitched reinforcements, unidirectional strands or any combination thereof.

For example, the reinforcing layer can include unidirectional carbon fibers, woven carbon fibers, braided carbon fibers, folded carbon sleeves, stitched carbon sleeves, woven fabrics, unidirectional carbon strands or any combination thereof.

For example, at least one reinforcing layer creates an inner or outer hoop on the core.

For example, the first reinforcing layer and the second reinforcing layer includes at least one of unidirectional fabrics, woven fabrics, braided reinforcements, folded sleeves, stitched reinforcements, unidirectional strands or any combination thereof.

For example, the first reinforcing layer and the second reinforcing layer can include at least one of unidirectional carbon fibers, woven carbon fibers, braided carbon fibers, folded carbon sleeves, stitched carbon sleeves, woven fabrics, unidirectional carbon strands or any combination thereof.

For example, the first reinforcing layer creates an inner hoop on the core that is strong enough to withstand tension of spokes that are connectable thereto while ensuring overall stiffness of the rim in compression and flexion; and the second reinforcing layer creates an outer hoop on the core.

For example, the at least one reinforcing layer, the first reinforcing layer or the second reinforcing layer includes dry fibers that are resin-free.

For example, the core can be solid, like an inflatable bladder or foam.

For example, the core can be fusible. For example, the core can be made of a material such as wax, which can be melted. Some of the advantages of having a fusible core are that the core can be fused or melted easily. For example, melting the core includes:

building a hole on an outer surface of the cured rim to access the core; and heating the cured rim to melt the core, wherein the core leaves the molded rim through the hole.

For example, the core is made of at least one of wax, foam, bladder or any combination thereof. For example, the bladder can be inflatable.

For example, the core has substantially a circular cross section.

For example, the core has an annular shape.

For example, the core has substantially a frustum cross section.

For example, the at least one braided sleeve is bi-axial.

For example, the at least one braided sleeve is tri-axial.

For example, the at least one braided sleeve is made out of composite fibers including at least one of carbon, glass, aramid (such as Kevlar™), natural fibers, Vectran™, Innegra™, etc.

For example, the braided sleeves are resin-free.

For example, the braided sleeve comprises dry fibers that are resin-free.

For example, placing at least one braided sleeve on the core comprises placing at least one braided sleeve having dry fibers on the core.

For example, placing at least one braided sleeve on the core includes placing the at least one braided sleeve that is resin free on the core.

For example, the mold is adapted to shape the hook on the external surface of the rim.

For example, while injecting resin inside the mold, the mold is half closed to leave a small gap to ease the impregnation of the braided sleeves.

For example, once the mold is full of resin, the mold is fully closed to allow the resin to fully cure.

For example, once the mold is fully closed, the mold is heated.

For example, the injection can be made inside the mold while the mold is closed.

For example, placing at least one braided sleeve on a core includes:
- assembling a first set of sleeves on the core to define an interior shape of the rim;
- assembling a second set of sleeves on the core to define an exterior shape of the rim;
- assembling a third set of sleeves on the core to define a rim beds; and
- assembling a fourth set of sleeves on the core to define a spoke nipple beds.

For example, the at least one braided sleeve is stitched on itself to shape a hook portion of the rim.

For example, the at least one braided sleeve is folded on itself before being stitched.

For example, the hook portion comprises one wall on each side of the rim.

For example, the hook portion of the rim is preformed in the mold.

For example, the hook portion of the rim is preformed with the use of a binder.

For example, at least one reinforcing layer defines the hook portion of the rim. For example, at least one another braided sleeve is coupled to said at least one braided sleeve to shape a hook portion of the rim.

For example, the method includes:
- placing the at least one braided sleeve on the core dimensioned to define the shape of the internal wall of the rim;
- placing at least one another braided sleeve on said at least one braided sleeve to shape a hook portion of the rim;
- inserting the at least one braided sleeve placed on the core and the at least one further braided sleeve on the at least one braided sleeve, inside a mold that is dimensioned to define a shape of an external wall shape of the rim;
- injecting a resin inside the mold to contact the mold and impregnate the at least one braided sleeve and the at least one further braided sleeve with the resin;
- curing the resin to form the internal and external walls of the rim and the hook of the rim and obtain a cured rim having the core connected thereto;
- removing the cured rim and core from the mold; and
- removing the core.

For example, the method includes: placing the at least one braided sleeve on the core dimensioned to define the shape of the internal wall of the rim; inserting the at least one braided sleeve placed on the core, inside a mold that is dimensioned to define a shape of an external wall shape of the rim; placing at least one another braided sleeve on said at least one braided sleeve to shape a hook portion of the rim; injecting a resin inside the mold to contact the mold and impregnate the at least one braided sleeve and the at least one further braided sleeve with the resin; curing the resin to form the internal and external walls of the rim and the hook of the rim and obtain a cured rim having the core connected thereto; removing the cured rim and core from the mold; and removing the core.

For example, the first external wall and said second external wall can be fixed together.

For example, the first external wall and said second external wall can be fixed together by means of a resin.

For example, the first external wall and said second external wall can be glued together.

For example, the first external wall can comprise a braided sleeve.

For example, the first external wall can comprise a braided sleeve that is stitched on itself.

For example, the first external wall comprises a braided sleeve that is stitched on itself to shape the hook of the rim.

For example, the braided sleeve can be folded on itself before being stitched.

For example, the first external wall can be made of said braided sleeve.

For example, the second external wall can comprise a braided sleeve.

For example, the second external wall can comprise a braided sleeve that is stitched on itself.

For example, the second external wall comprises a braided sleeve that is stitched on itself to shape the hook of the rim.

For example, the braided sleeve can be folded on itself before being stitched.

For example, the second external wall can be made of said braided sleeve.

For example, the second external wall can be made of said braided sleeve.

According to another aspect, there is provided a kit comprising at least one bicycle rim as defined in the present disclosure and at least one tire.

For example, the kit can further comprise instructions on how mounting said tire and said rim.

According to another aspect, there is provided a bicycle comprising at least one bicycle rim as defined in the present disclosure.

Referring to FIG. 1, there is shown a cross section view of a rim 1. For example, the rim is substantially circular. The rim 1 has an outer annular portion 8 and an inner annular portion 3. The outer annular portion 8 defines the shape 5 of the rim. As shown in FIG. 1, the outer portion 8 is made of a material that goes around the entire shape of the rim 1. For example, outer portion can be made of a carbon braided sleeve. For example, the external shape can be made of a carbon braided sleeve and represent the outer surface of the outer portion 8.

Referring to FIG. 1, the inner annular portion 3 defines the interior shape of the rim. For example, the inner annular portion 3 defines an internal chamber 4. As shown in FIG. 1, the outer portion 8 and the inner portion 3 are made of the same material. For example, the inner annular portion can be made of a carbon braided sleeve.

The inner chamber 4 is defined by walls of the inner portion 3. On the innermost part of the walls of the inner portion 3, there is a reinforcing layer 7. The reinforcing layer 7 can be a spokes bed. For example, the reinforcing layer can be laid on the inner portion to receive the spokes of a bicycle wheel.

Still referring to FIG. 1, opposite to the reinforcing layer 7, there is shown another reinforcing layer 9. The reinforcing layer 9 can be a rim bed. The rim bed can help lock the tire beads into place. For example, the rim bed can be a reinforced part of the rim. When the rim bed is properly shaped along with the braided sleeve, it can help lock the tire beads into place.

On top of the rim bed 9, there is shown hooks 6. As shown, the hooks 6 protrude inwards to define a semi-open chamber, defined by the well bed 2 on top of the rim bed. The well bed 2 and the two hooks 6 define the semi-open chamber. The defined semi-open chamber can receive the tire beads such that the tire sits on the well. The tire is retained within the well bed by the hooks.

For example, tire beads are what hold the tire on the rim. When mounting a tire on the rim, the tire beads need to go over the rim's hook. For example, referring to FIG. 1, the tire beads needs to go over the hooks 6. As shown in FIG. 1, the well bed 2 has a curved bed.

Figure 2:
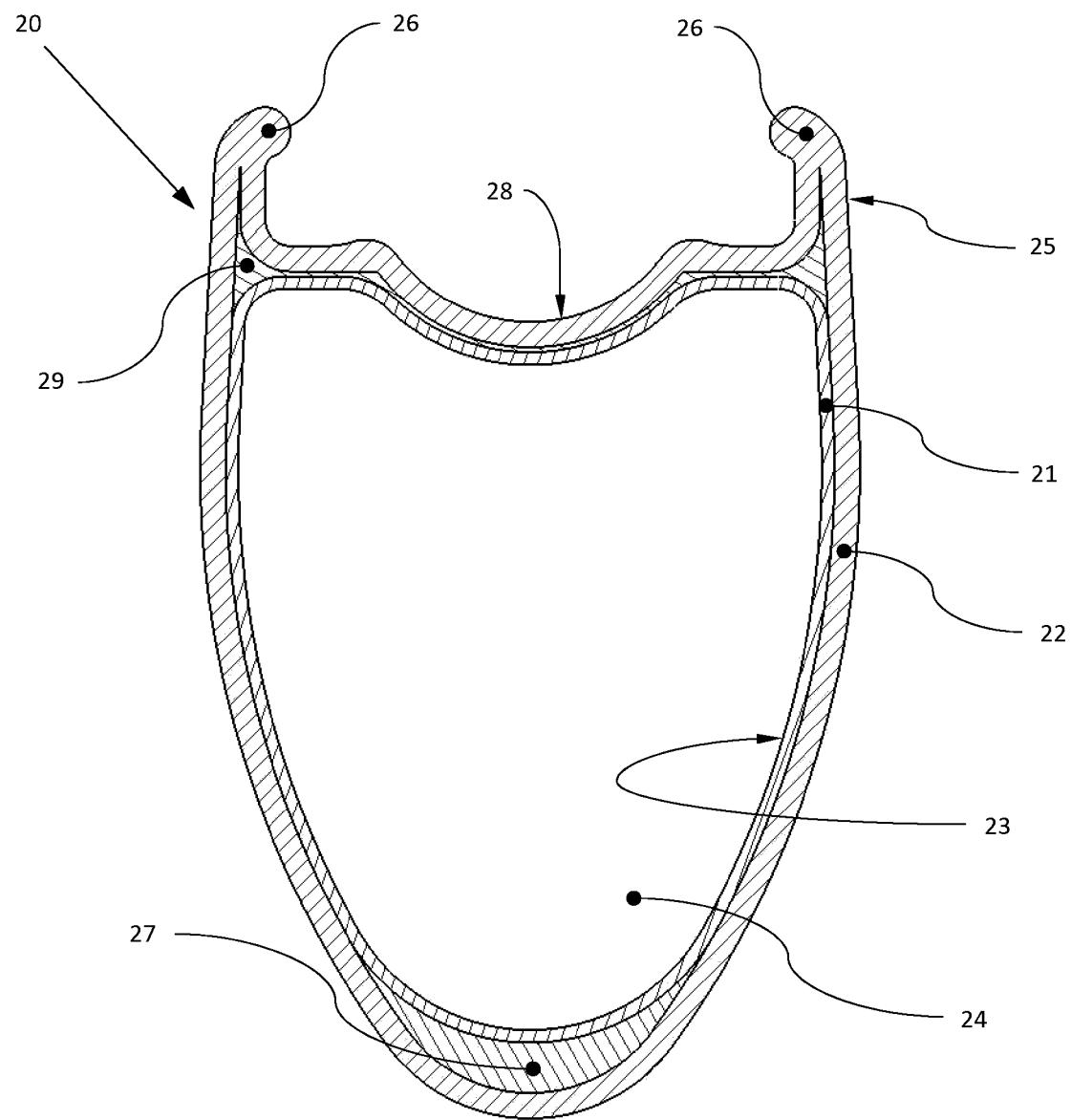
FIG. 2 illustrates a cross section view of a rim according to one example.

Now, referring to FIG. 2, there is shown a cross section view of a rim 20 according to another embodiment. The rim 20 is substantially circular. The rim 20 has an outer portion 22 and an inner portion 21. The outer portion 22 defines the external shape 25 of the rim. The outer portion 22 is made of a material that goes around the external shape of the rim 2.

The inner portion 21 defines the interior shape of the rim. For example, the inner portion 21 defines an internal chamber 24. The inner chamber 24 is defined by walls of the inner portion 21.

The outer portion 22 and an inner portion 21 can be made of different materials. The outer portion 22 and an inner portion 21 can also be made of the same materials. However, compared to the example shown in FIG. 1, FIG. 2 shows reinforcing layers that are sandwiched between the outer portion 22 and an inner portion 21. For example, on the innermost part of the interior chamber, under the walls defined by the inner portion 21, there is shown a reinforcing layer 27. The reinforcing layer 27 is sandwiched between the outer portion 22 and an inner portion 21. The reinforcing layer 27 does not extend through the entire circumference defined by the outer portion 22 and/or an inner portion 21. As shown, the reinforcing layer 27 defines an arc that is sandwiched between the outer portion 22 and an inner portion 21.

In another example, a reinforcing layer can extend through the entire circumference defined by the outer portion 22 and/or an inner portion 21.

Referring to FIG. 2, the reinforcing layer 27 can be part of a spokes bed. For example, the reinforcing layer 27 can reinforce the area where the spoke nipple passes through the rim. The reinforcing layer 27 can lower stress concentrations in the spoke bed while maintaining a light weight profile.

Still referring to FIG. 2, there is shown another reinforcing layer 29. The reinforcing layer 29 can be located opposite to the reinforcing layer 27. The reinforcing layer 29 can be part of the rim bed. The rim bed can help lock the tire beads into place. The reinforcing layer 29 is sandwiched between the outer portion 22 and an inner portion 21.

There are hooks 26 defined by the outer portion 22 on top of the rim bed 29. The hooks 26 extend inwards to define a semi-open chamber, defined by the well bed 28. The well bed 28 has a curved shape bordered by the hooks 26. The well bed 28 can receive the tire beads such that the tire seats on the well bed. The tire is retained within the well bed by the hooks.

Figure 3:
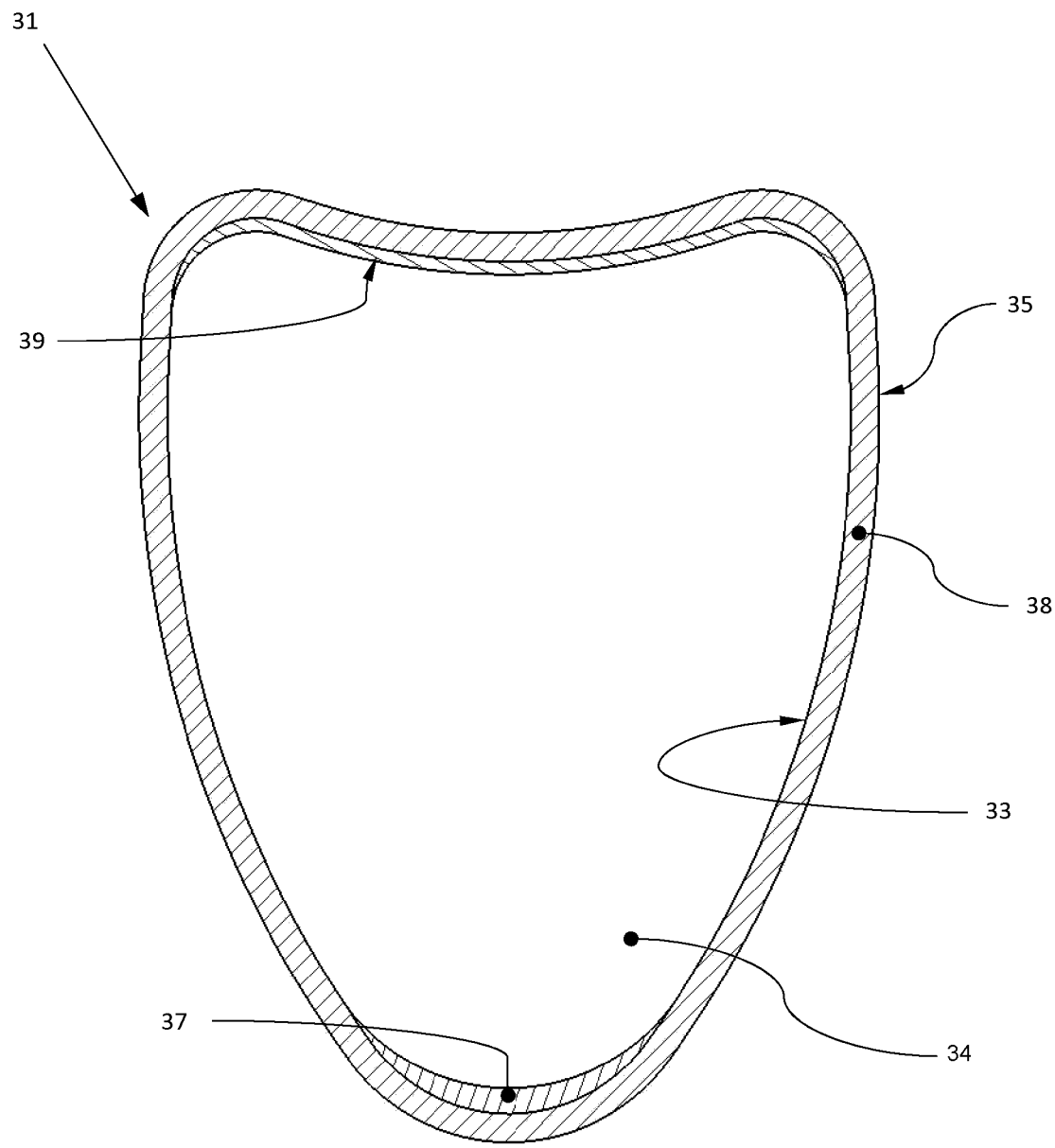
FIG. 3 illustrates a cross section view of a rim according to one example.

Referring to FIG. 3, there is shown a cross section view of a rim 31. The rim 31 has an outer annular portion 38. The outer annular portion 38 defines the external shape 35 of the rim. The outer annular portion 38 also defines the internal chamber of the rim 34. As shown in FIG. 3, the outer portion 38 is made of a material that goes around the entire shape of the rim 35.

The inner chamber 34 is defined by the internal walls 33 of the outer portion 38. On the innermost part of the walls of the inner portion 3, there is a reinforcing layer 37. The reinforcing layer 37 is laid on the internal wall 33. The reinforcing layer 37 defines an arc. The reinforcing layer 37 can be part of a spokes bed, reinforcing the area where the spoke nipple passes through the rim. As such, the reinforcing layer 37 can lower stress concentrations in the spoke bed while maintaining a light weight profile.

Still referring to FIG. 3, there is shown another reinforcing layer 39 that is laid on the wall of the internal chamber 33. The reinforcing layer 39 can be located opposite to the reinforcing layer 37. The reinforcing layer 39 can be part of the rim bed.

Figure 4:
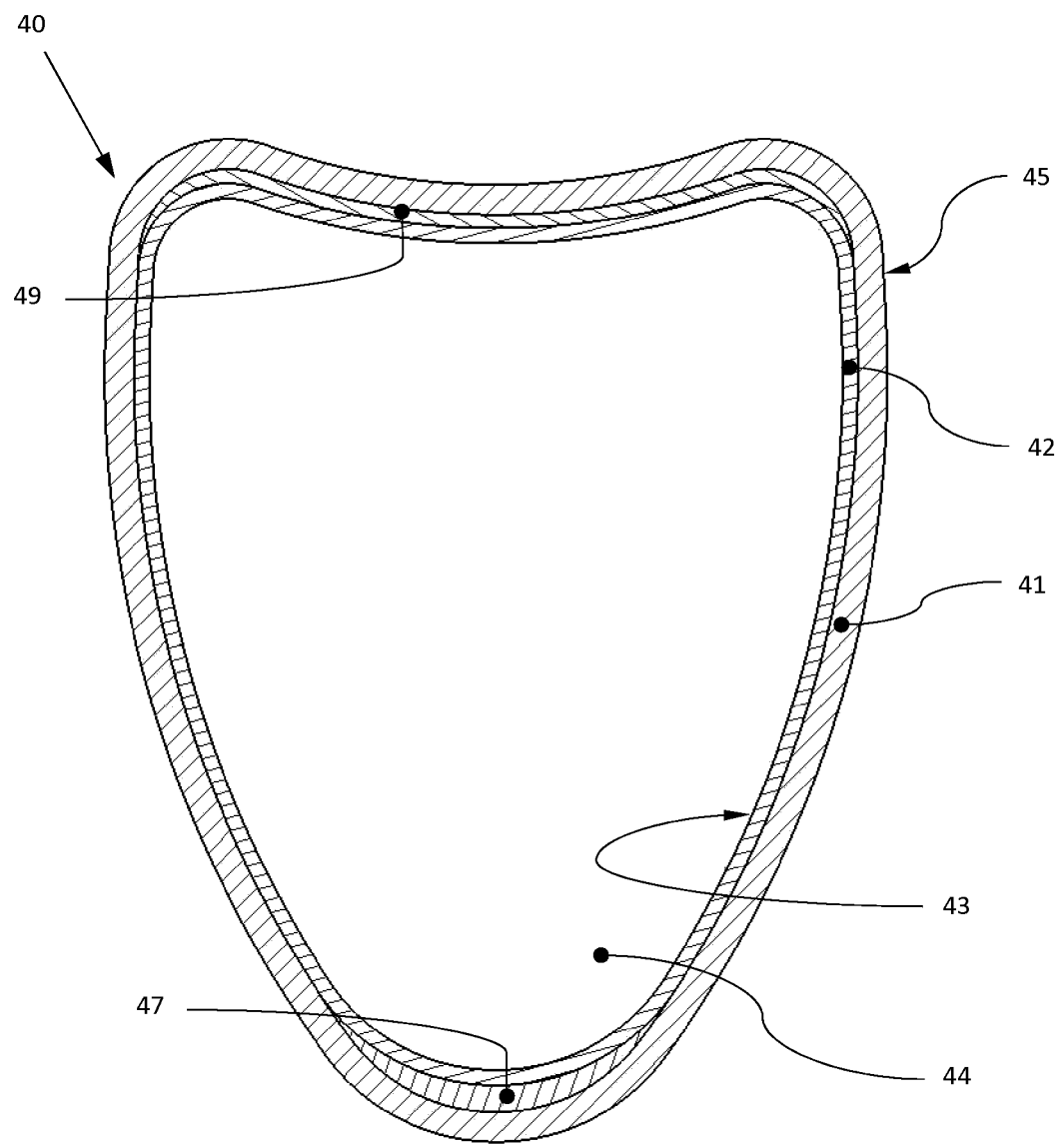
FIG. 4 illustrates a cross section view of a rim according to one example.

Now, referring to FIG. 4, there is shown a cross section view of a rim 40 according to one example. The rim 40 is substantially circular. The rim 40 has an outer portion 41 and an inner portion 42. The outer portion 41 defines the external shape 45 of the rim. The outer portion 41 is made of a material that goes around the external shape of the rim 40.

The inner portion 42 defines the interior shape of the rim 40. For example, the inner portion 42 defines an internal chamber 44. The internal chamber 44 is defined by walls of the inner portion 42.

The outer portion 41 and an inner portion 42 can be made of different materials. The outer portion 41 and an inner portion 42 can also be made of the same materials. However, compared to the example shown in FIG. 3, FIG. 4 shows reinforcing layers that are sandwiched between the outer portion 41 and an inner portion 42. For example, on the innermost part of the interior chamber, under the walls defined by the inner portion 42, there is shown a reinforcing layer 47. The reinforcing layer 47 is sandwiched between the outer portion 41 and an inner portion 42. The reinforcing layer 47 does not extend through the entire circumference defined by the outer portion 41 and/or an inner portion 42. As shown, the reinforcing layer 47 defines an arc that is sandwiched between the outer portion 41 and an inner portion 42.

In another example, a reinforcing layer can extend through the entire circumference defined by the outer portion 41 and/or an inner portion 42.

Referring to FIG. 4, the reinforcing layer 47 can be part of a spokes bed. For example, the reinforcing layer 47 can reinforce the area defining the spoke bed, where the spoke nipple passes through the rim. The reinforcing layer 47 can lower stress concentrations in the spoke bed while maintaining a light weight profile.

Figure 18:
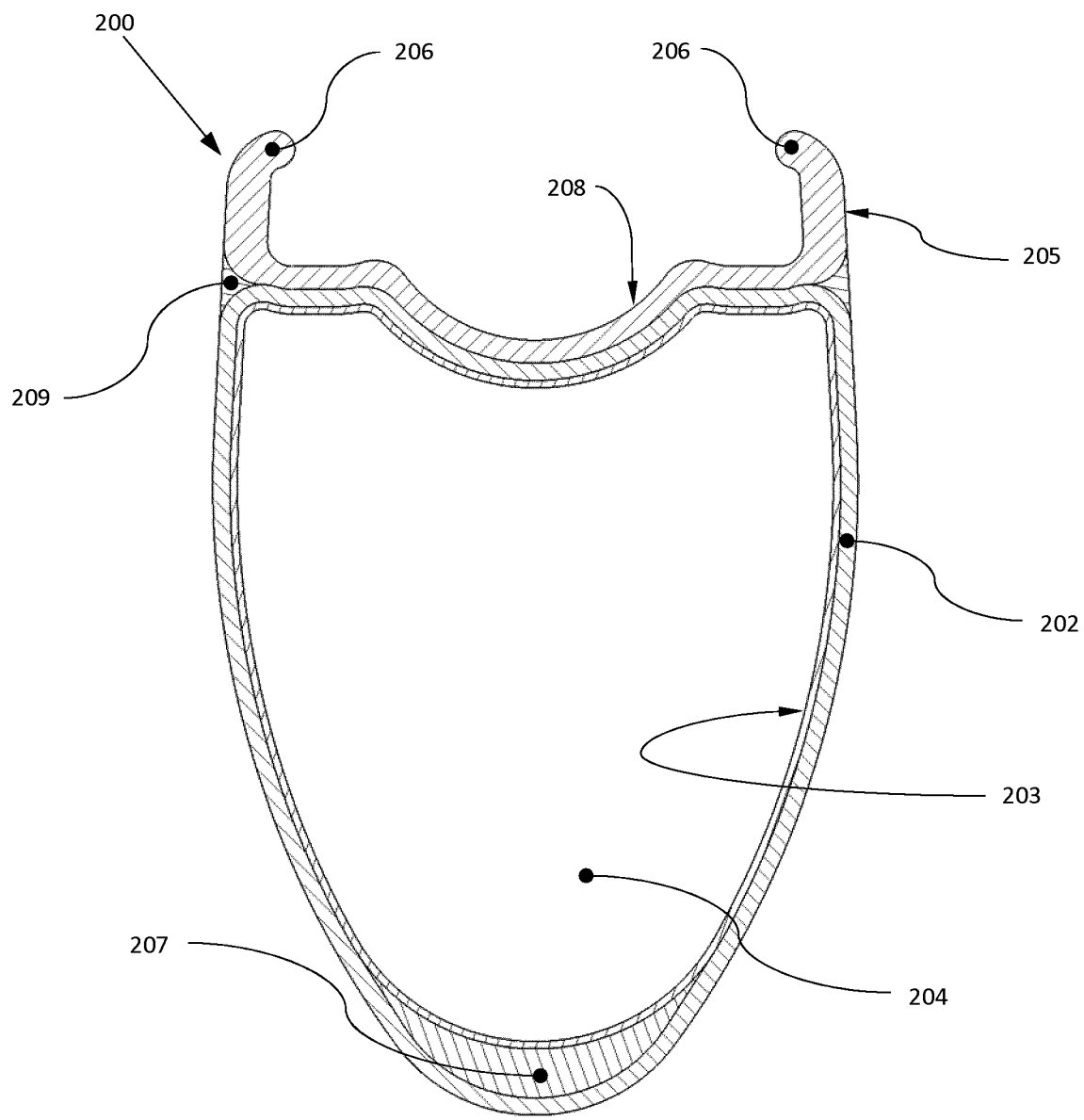
FIG. 18 illustrates a cross section view of a rim according to one example.

Still referring to FIG. 4, there is shown another reinforcing layer 49. The reinforcing layer 49 can be located opposite to the reinforcing layer 47. The reinforcing layer 49 can be part of the rim bed. The reinforcing layer 49 is sandwiched between the outer portion 41 and an inner portion 42. Referring now to FIG. 18, there is shown a cross section view of a rim 200 according to one example. For example, the rim can be substantially circular.

The rim 200 has outer portions 202, 206 and 209. The rim 200 has an inner portion 203. The outer portions 202, 206 and 209 define the external shape 205 of the rim. The outer portions 202, 206 and 209 can made of a material that goes around the external shape of the rim 200. For example, each of the outer portions 202, 206 and 209 can be made of a different material to optimize the global performance of the rim.

According to another example, each of the outer portions 202, 206 and 209 can be made of the same material. Specifically, the outer portions 202, 206 and 209 can be made of the same material to reduce manufacturing costs. For example, the materials for the outer portion can be selected from the following: unidirectional fabrics, woven fabrics, braided reinforcements, folded sleeves, stitched reinforcements, unidirectional strands or any combination thereof.

The inner portion 203 defines the interior shape of the rim. For example, the inner portion 203 defines an internal chamber 204. The inner chamber 204 is defined by walls of the inner portion 203.

The outer portions 202, 206 AND 209 and an inner portion 203 can be made of different materials. The materials can be unidirectional fabrics, woven fabrics, braided reinforcements, folded sleeves, stitched reinforcements, unidirectional strands or any combination thereof. For example, the advantages of having different materials for the outer portions and the inner portions includes optimizing the performances of the rim.

The outer portion 202 and an inner portion 203 can also be made of the same materials, for example: unidirectional fabrics, woven fabrics, braided reinforcements, folded sleeves, stitched reinforcements, unidirectional strands or any combination thereof.

For example, on the innermost part of the interior chamber, under the walls defined by the inner portion 203, there is shown a reinforcing layer 207. The reinforcing layer 207 is sandwiched between the outer portion 202 and an inner portion 203. The reinforcing layer 207 does not extend through the entire circumference defined by the outer portion 202 and/or an inner portion 203. As shown, the reinforcing layer 207 defines an arc that is sandwiched between the outer portion 202 and an inner portion 203.

In another example, a reinforcing layer can extend through the entire circumference defined by the outer portion 202 and/or an inner portion 203. Advantages of having the reinforcing layer extending through the entire circumference includes obtaining better integrity for the reinforcing layer.

Still referring to FIG. 18, the reinforcing layer 207 can be part of a spokes bed. For example, the reinforcing layer 207 can reinforce the area where the spoke nipple passes through the rim. The reinforcing layer 207 can lower stress concentrations in the spokes bed while maintaining a light weight profile.

Still referring to FIG. 18, there is shown another reinforcing layer 209. The reinforcing layer 209 can be located opposite to the reinforcing layer 207. The reinforcing layer 209 can be part of the rim bed. The reinforcing layer 209 can be part of the outer portion 202 or the hooks portion 206.

The hooks portion 206 can extend inwards to define a semi-open chamber, defined by the well bed 208. The well bed 208 has a curved shape bordered by the hooks 206. The well bed 208 can receive the tire beads such that the tire seats on the well bed. The tire is retained within the well bed by the hooks portion.

Still referring to FIG. 18, there is shown the hook portion 206. For example, a first material can be coupled to outer portion 202 (which can be made of another material) to shape a hook portion of the rim. For example, the hook portion and the outer portion can be made of the same material, (such as a carbon breaded sleeve). Advantages of having the same material for the hook portion can include reducing the cost of manufacturing the rim.

According to another example, the hook portion and the outer portion can be made of different materials. Advantages of having a different material for outer portion and the hook portion can include optimizing the performance of the rim. Examples of materials can include: unidirectional fabrics, woven fabrics, braided reinforcements, folded sleeves, stitched reinforcements, unidirectional strands or any combination thereof. Examples of materials can also include: unidirectional carbon fibers, woven carbon fibers, braided carbon fibers, folded carbon sleeves, stitched carbon sleeves, woven fabrics, unidirectional carbon strands or any combination thereof.

Figure 5:
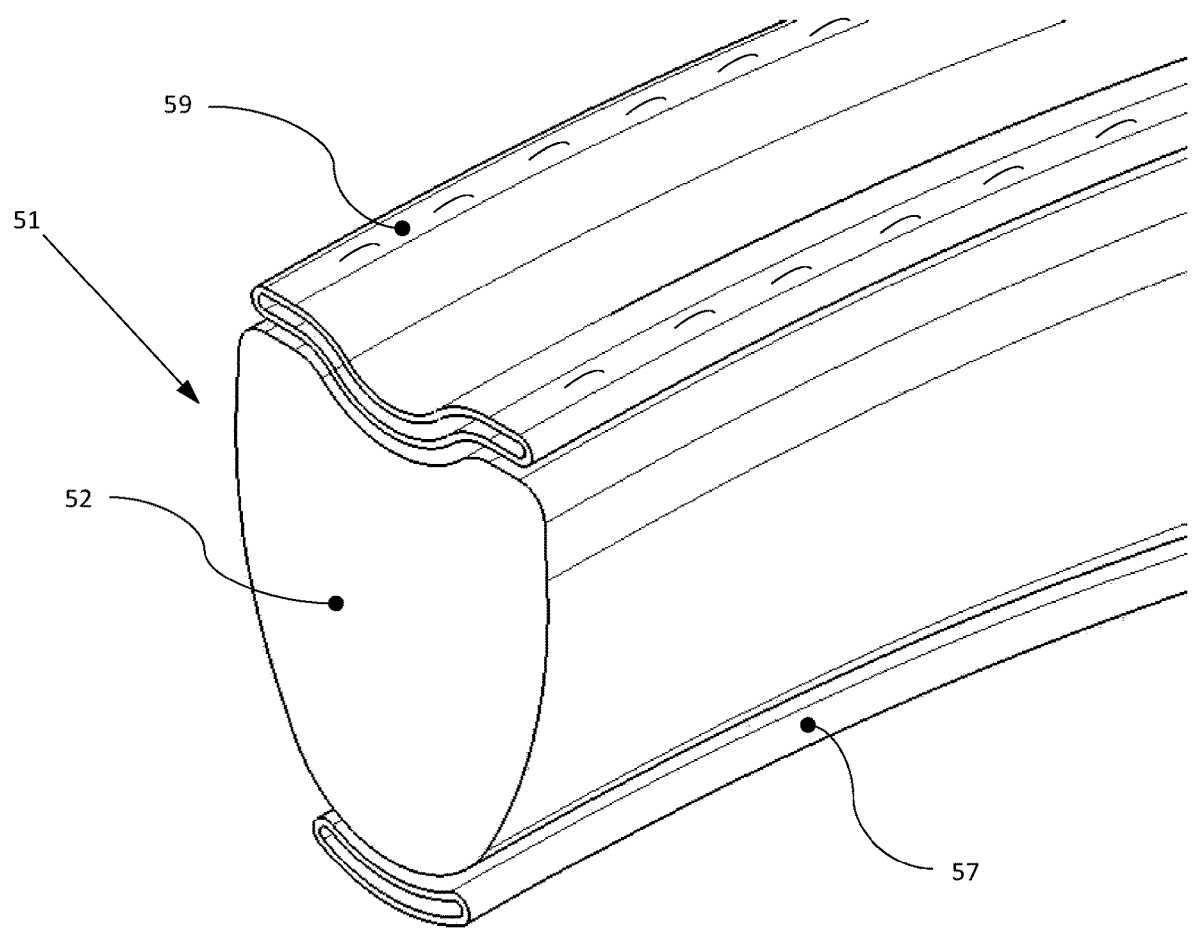
FIG. 5 illustrates a cross section view of a core with mounted layers according to one example.

Referring now to FIG. 5, there is shown a core system 51. The core system 51 includes a core 52. The core can be made of wax, foam, bladder or any combination thereof. The core can be made of any other suitable materials.

For example, the core can have a substantially circular cross section. For example, the core can have an annular shape. For example, the core can have a substantially frustum cross section.

The core system 51 includes a core having reinforcing layers connected thereto. As shown in FIG. 5, there is a layer 59 that is connected to the core 52. The layer 59 can be a reinforcing layer. There is a layer 57 that is connected to the core 52. The layer 57 can be a reinforcing layer.

Multiple techniques can be used to maintain a reinforcing layer on the core. For example, a reinforcing layer can be bonded to the core by an adhesive. For example, a reinforcing layer can be maintained on the core by a rope that wraps around the core.

Referring to FIG. 5, the layer 59 is made of a sleeve that can be configured to define the rim bed. The layer 57 is made of a sleeve that can be configured to define the spokes bed. The sleeve can be folded and stitched onto itself. The sleeve can also be sewn.

Figure 6:
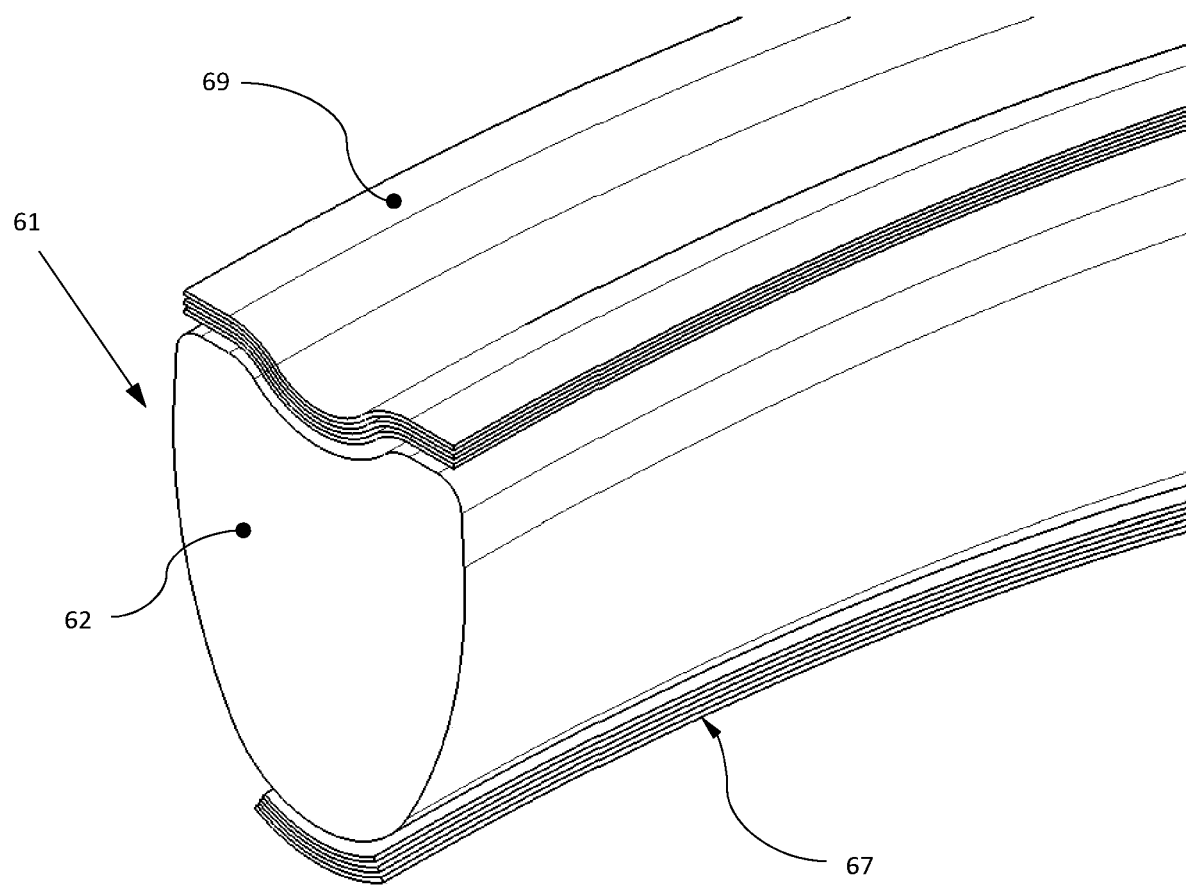
FIG. 6 illustrates a cross section view of a core with mounted layers according to one example.

Referring to FIG. 6, there is shown a core system 61. The core system 61 includes a core 62 having reinforcing layers connected thereto. A reinforcing layer 69 defining a rim bed is connected to the core 62. A reinforcing layer 67 defining a spoked bed is connected to the core 62. For example, the reinforcing layer can be made of unidirectional fabrics, woven fabrics, braided reinforcements, folded sleeves, stitched reinforcements, unidirectional strands or any combination thereof.

For example, the reinforcing layer can be also made unidirectional carbon fibers, woven carbon fibers, braided carbon fibers, folded carbon sleeves, stitched carbon sleeves, woven fabrics, unidirectional carbon strands or any combination thereof. For example, the reinforcing layers can be made of any suitable materials.

The braided sleeve can be bi-axial. The braided sleeve can be tri-axial. The braided sleeve can be made out of composite fibers including carbon, glass, aramid, natural fibers, Kevlar™, Vectran™ and Innegra™. The braided sleeves can be resin-free. The braided sleeve can include composite fibers. The braided sleeve can include dry fibers. For example, the dry fiber can be resin-free.

Various techniques can be used to maintain a reinforcing layer on the core. For example, a reinforcing layer can be bonded to the core by an adhesive. For example, a reinforcing layer can be maintained on the core by a rope that wraps around the core.

For example, a reinforcing layer can be maintained on the fusible core by a rope that wraps around the fusible core and possibly in-between the fiber yarns. For example, FIG. 7 shows a triaxial braided sleeve made of carbon yarns in the 0° direction and spandex threads in the 45° and −45° directions.

Figure 7:
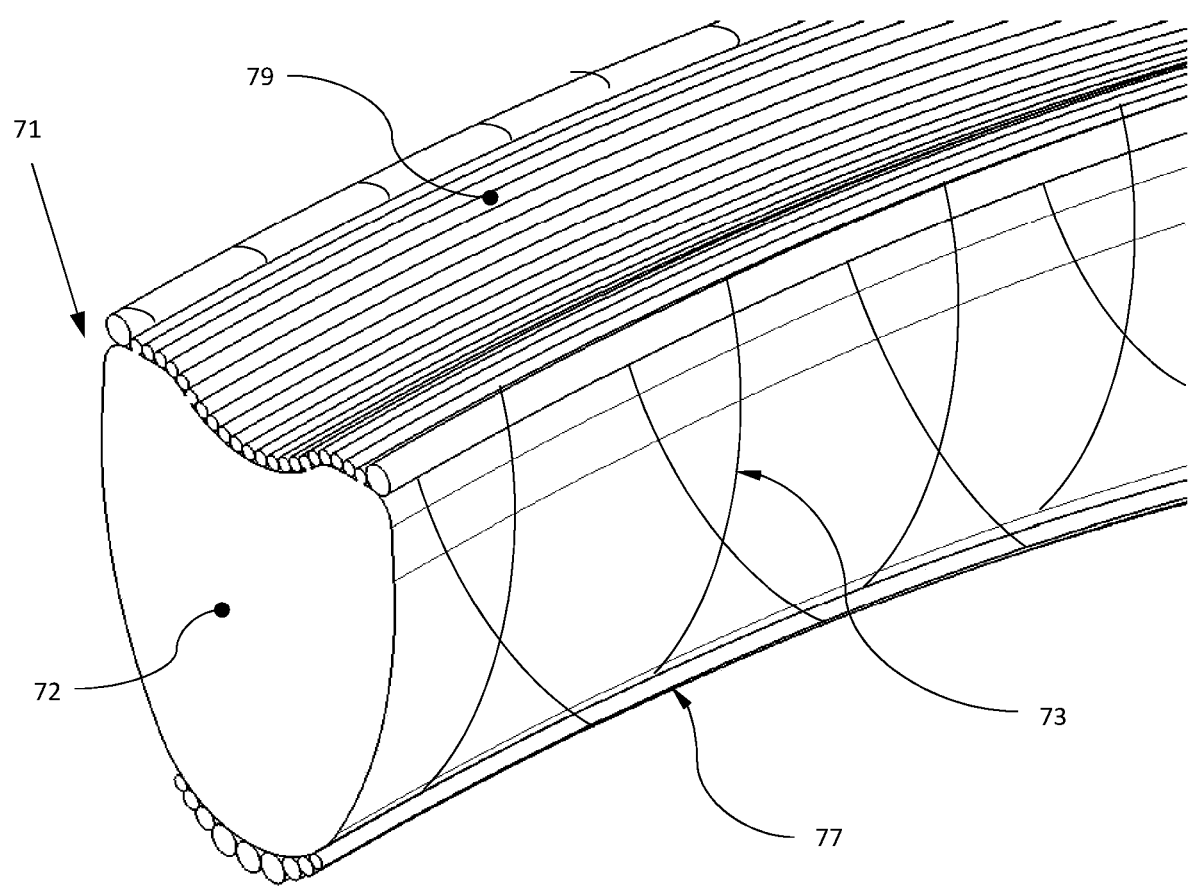
FIG. 7 illustrates a cross section view of a core with mounted layers according to one example.

Referring to FIG. 7, there is shown a core system 71. The core system 71 includes a core 72 having reinforcing unidirectional yarns 79 and 77 connected thereto. Reinforcing unidirectional yarns 79 and 77 are maintained on the core 72 by biaxial threads 73 that wraps around the core 72 and in-between the reinforcing unidirectional yarns 79 and 77. The reinforcing unidirectional yarns 79 and 77, along with the threads 73, form a triaxial braided sleeve system. For example, the threads can be made of spandex. For example, the threads can be made of elastic.

As shown in FIG. 7, reinforcing unidirectional yarns 79 defining a rim bed are maintained on to the core 72 by threads 73. Reinforcing unidirectional yarns 77 defining a spokes bed is maintained on to the core 72 by threads 73. For example, the reinforcing unidirectional yarns 79 and 77 can be made of strands, such as unidirectional carbon strands. For example, the strands and the binding threads form a sleeve which can be elastic.

Referring to FIG. 7, there is shown a triaxial braided sleeve made of carbon yarns in the 0° direction and spandex threads in the 45° and −45° directions.

Figure 8:
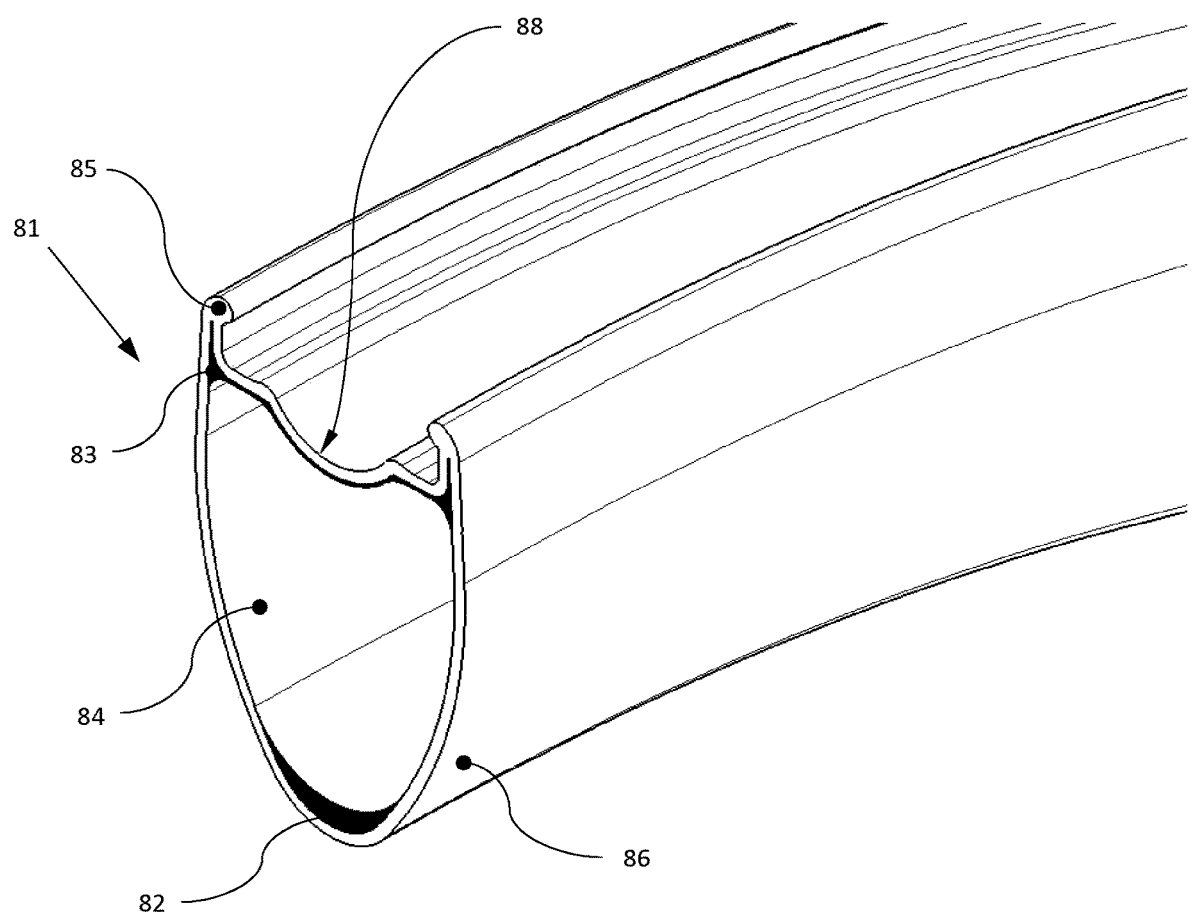
FIG. 8 illustrates a cross section view of a rim according to one example.

Referring to FIG. 8, there is shown a cross section view of a rim 81. The rim 81 has an outer surface 86 defining an external shape of the rim. The rim 81 has an inner surface 84 defining an inner chamber. The inner chamber 84 is defined by inner walls. For example, the inner walls of the inner chamber 84 and the outer surface 86 can be made of the same material. However, when there are reinforcing layers on the inner walls of the inner chamber, the inner walls can be made of materials that are different from the outer surface On the innermost part of the walls of the inner chamber 84, there is a reinforcing layer 82. The reinforcing layer 82 defines the spokes bed. Opposite to the reinforcing layer 82, there is shown another reinforcing layer 83. The reinforcing layer 83 defines a rim bed. For example, the rim bed can help lock the tire beads into place. For example, the shape of the rim bed can be formed by the external mold that shapes the rim, and can be composed of the braided sleeve and a reinforcing layer. Depending on the shape of the rim bed, it can lock the tire beads into place (ex: tubeless rims).

On top of the rim bed 9, there is shown hooks 85. As shown, the hooks 85 protrude inwards to define a well bed 88. The well bed 88 can be in the shape of a curved semi-open chamber on top of the rim bed. The curved well bed can receive tire beads of a tire such that the tire sits on the well. The tire is retained within the well bed by the hooks.

Figure 9A:
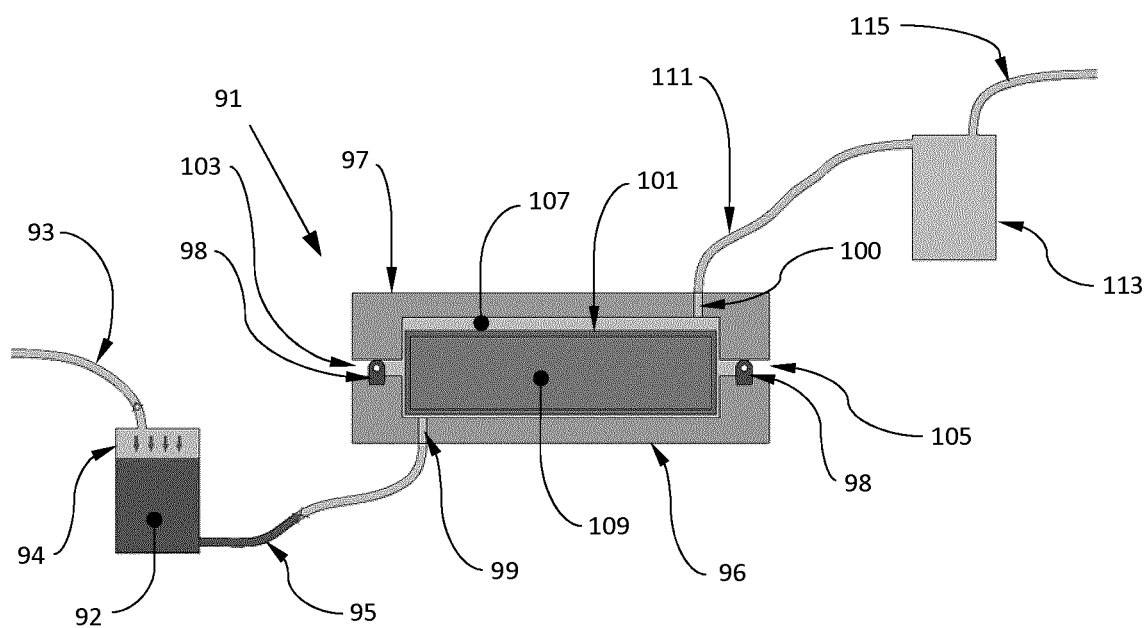
FIG. 9A illustrates a perspective view of a mold according to one example.
Figure 9B:
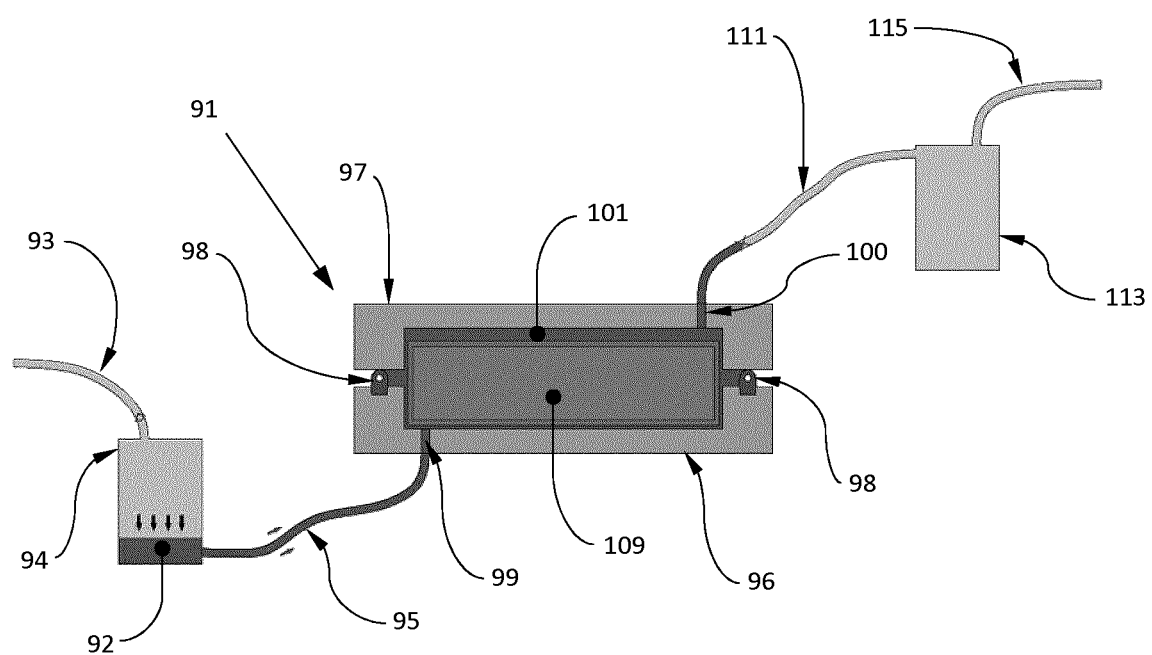
FIG. 9B illustrates a perspective view of a mold according to one example.
Figure 9C:
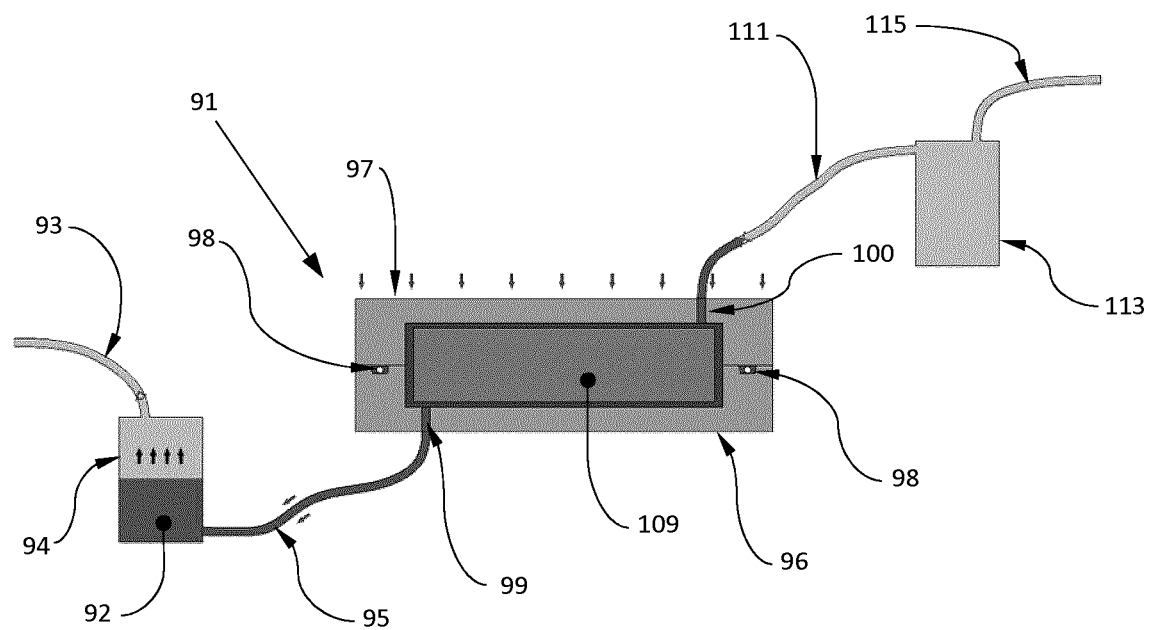
FIG. 9C illustrates a perspective view of a mold according to one example.

Referring to FIGS. 9A, 9B and 9C, there are shown perspective views of mold systems for manufacturing rims.

Referring to FIG. 9A, there is shown a mold 91. A pressure pot 94 is connected to the mold 91 by way of conduit 95. The conduit 95 is connected to the mold through the inlet 99. For example, the pressure pot can be used to inject resin to the mold cavity. For example, raising the pressure in the pot will push onto the resin and make it move towards the mold. This configuration can be a cheap alternative to more complex injection systems which are widely used in the composite industry but are really expensive. As an alternative to the pressure pot 94, injection can be carried out by a piston (e.g. air piston or hydraulic piston).

A resin retention pot 113 is also connected to the mold 91 by way of conduit 111. The conduit 111 is connected to the mold through the inlet 100. The resin pot can be used to prevent the resin that gets out of the mold under pressure to reach the vacuum pump and damage it. For example, the resin pot can be a safe equipment to use to protect the pump.

In one embodiment, a method for manufacturing a rim include injecting a resin inside a mold, the mold including at least one braided sleeve on a core dimensioned to define a shape of an internal wall of the rim. The mold can be dimensioned to define a shape of an external wall shape of the rim. The act of injecting the resin can be carried out to contact the mold and impregnate the at least one braided sleeve with the resin. The method further includes curing the resin to form the internal and external walls of the rim and obtain a cured rim having the core connected thereto. After, the cured rim and core can be removed from the mold. For example, the core can be fusible. The core can be removed separately from the cured rim once the cured rim is removed from the mold.

For example, the core can be removed separately while the cured rim is inside the mold.

The method can also include placing at least one braided sleeve on the core dimensioned to define the shape of the internal wall of the rim and inserting the braided sleeves placed on the core, inside the mold that is dimensioned to define the shape of an external wall shape of the rim.

The method can also include inserting the core inside the mold that is dimensioned to define the shape of an external wall shape of the rim; and placing the braided sleeve on the core dimensioned to define the shape of the internal wall of the rim.

Figure 14A:
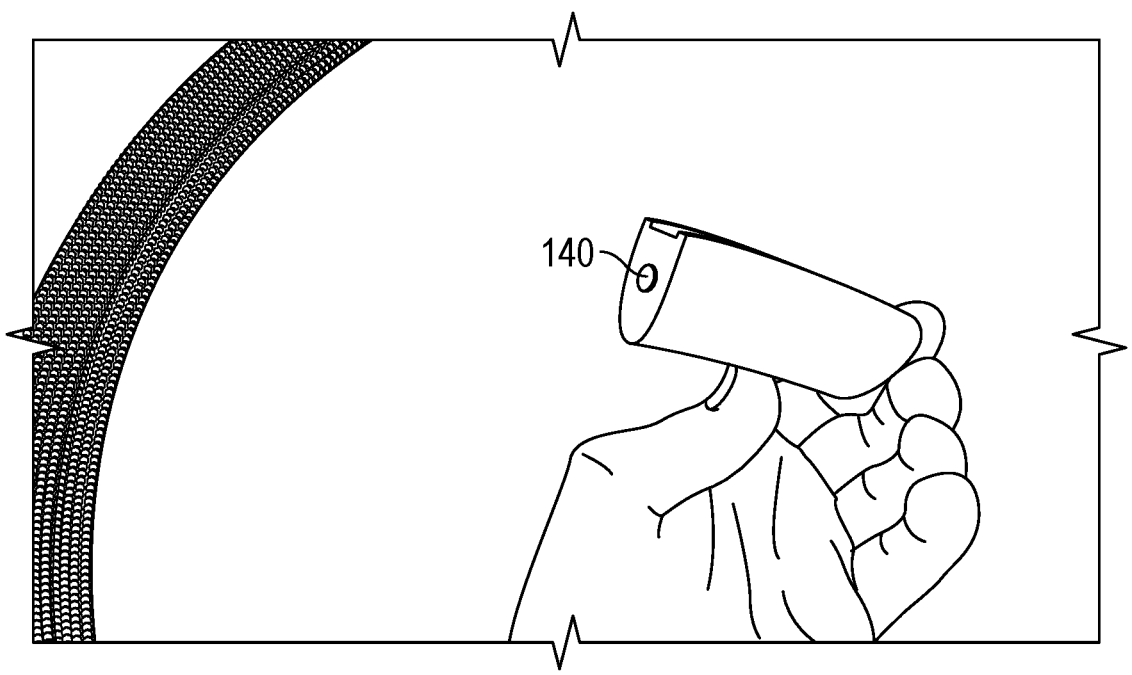
FIG. 14A illustrates a perspective view of a core according to one example.
Figure 14B:
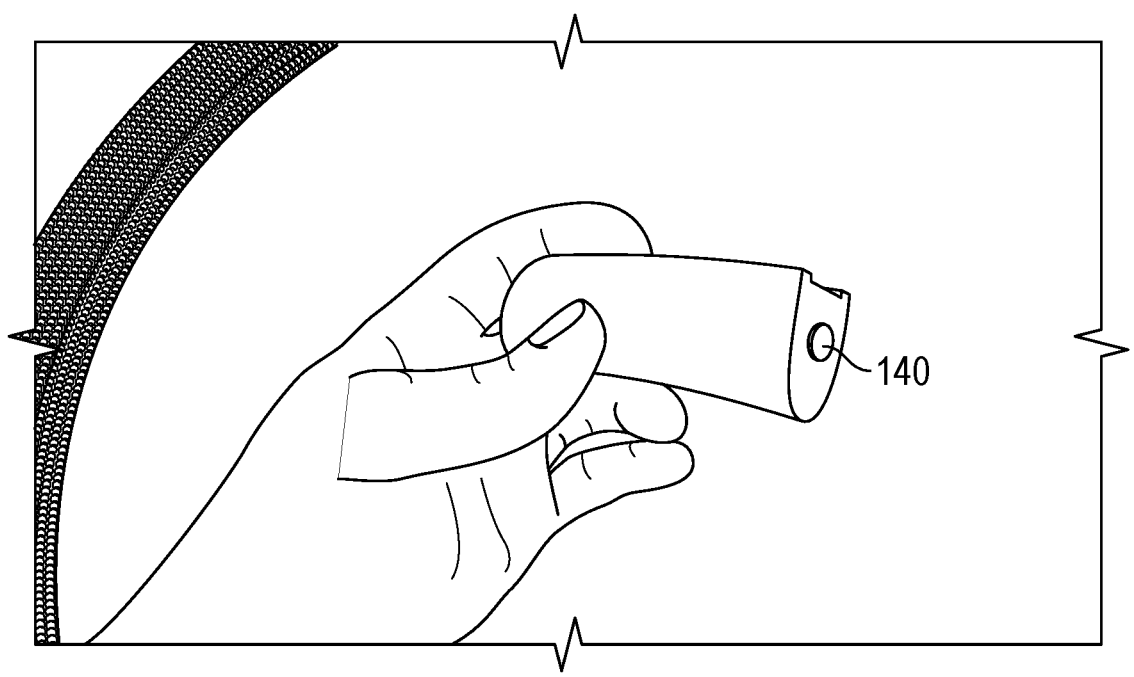
FIG. 14B illustrates a perspective view of a core according to one example.
Figure 15A:
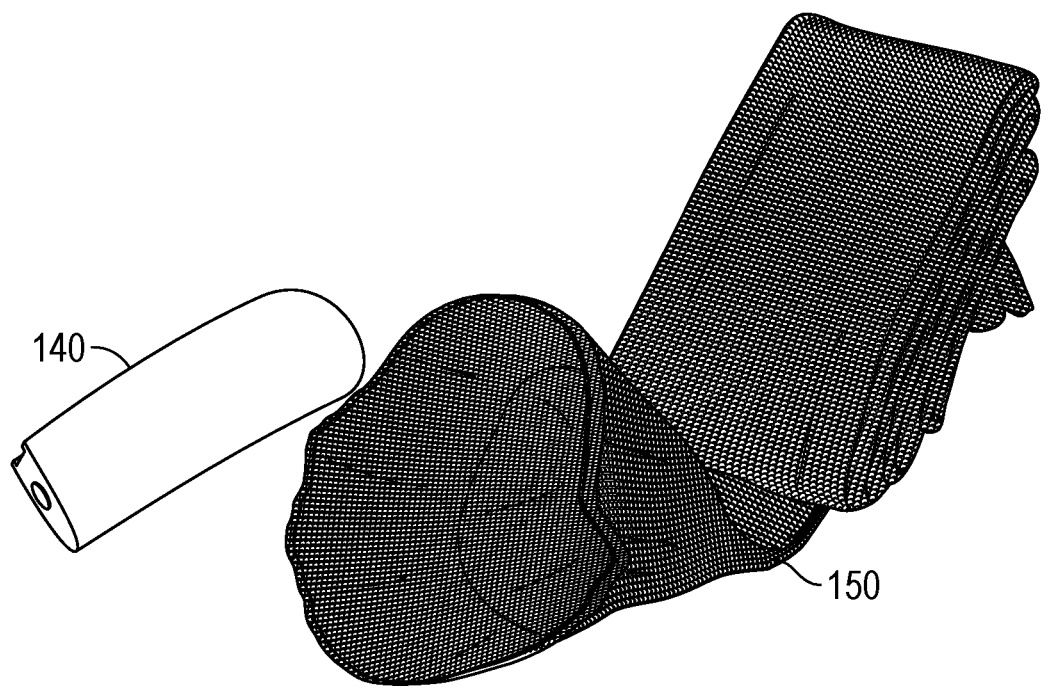
FIG. 15A illustrates a perspective view of a sleeve according to one example.
Figure 15B:
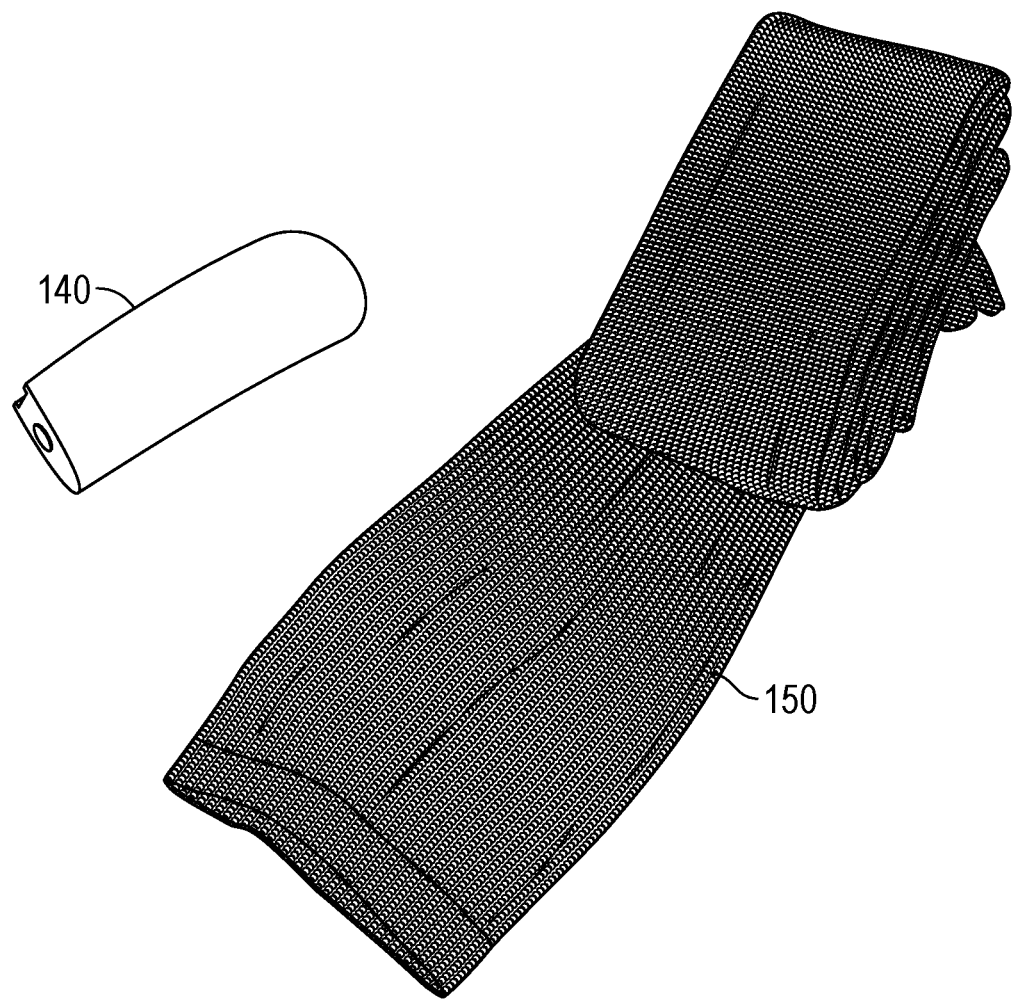
FIG. 15B illustrates a perspective view of a sleeve according to one example.
Figure 15C:
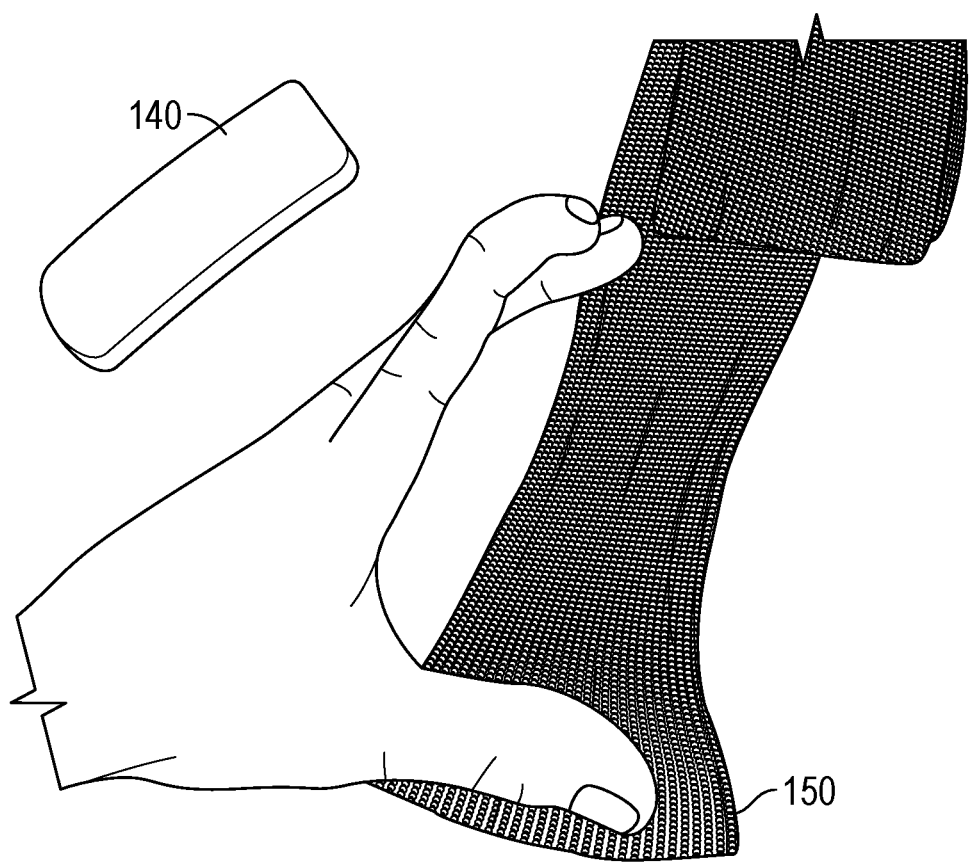
FIG. 15C illustrates a perspective view of a sleeve according to one example.
Figure 16A:
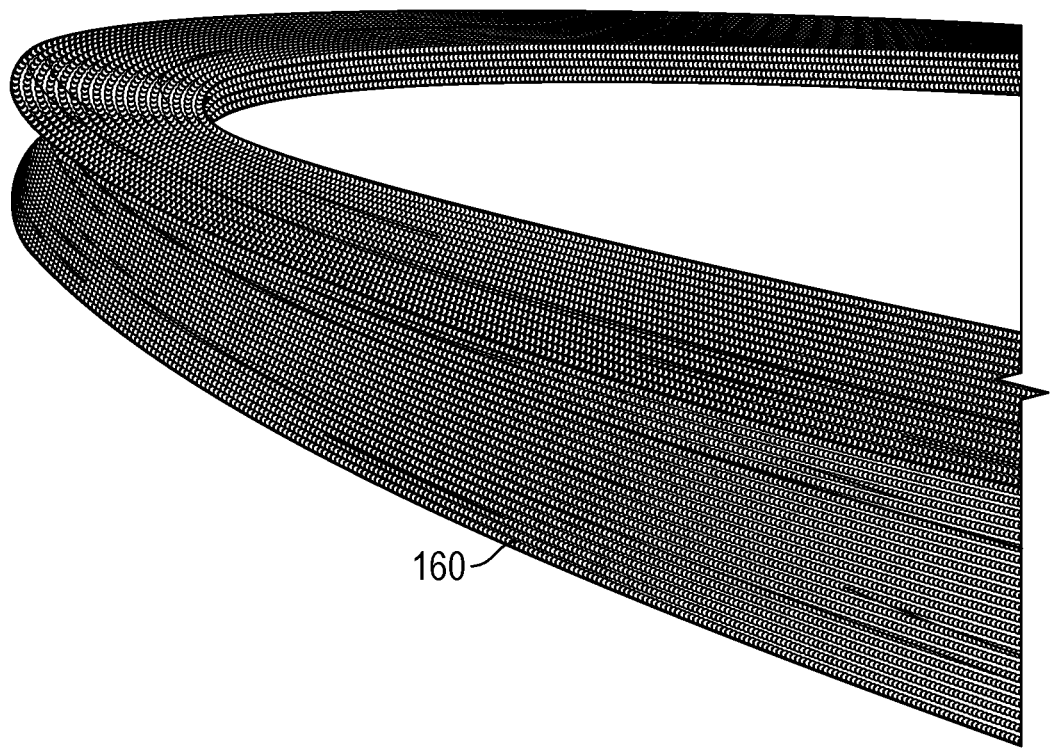
FIG. 16A illustrates a perspective view of a sleeve according to one example.
Figure 16B:
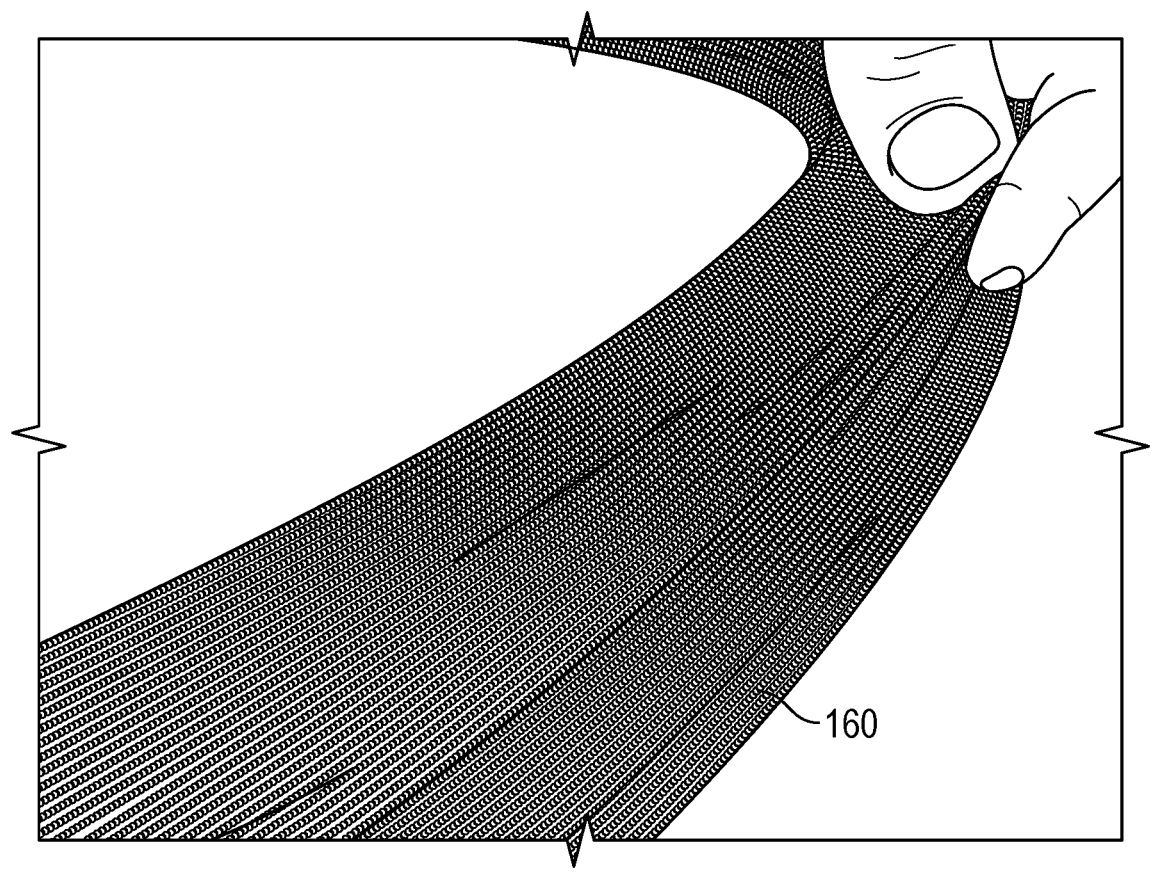
FIG. 16B illustrates a perspective view of a sleeve according to one example.
Figure 16C:
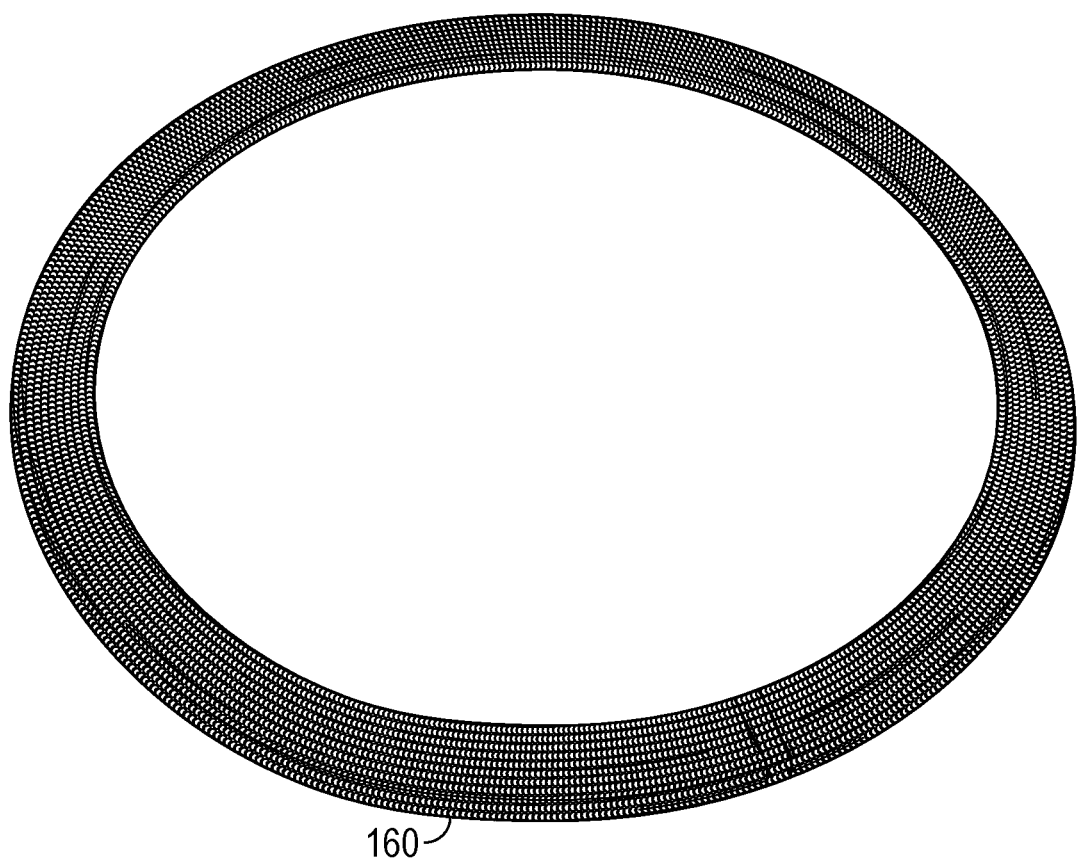
FIG. 16C illustrates a perspective view of a sleeve according to one example.

In another embodiment, the method of manufacturing a rim can include placing a braided sleeve 101 on a core 109 dimensioned to define a shape of an internal wall of the rim. Referring to FIGS. 14A and 14B, there are shown a core 140. Referring to FIGS. 15A, 15B and 15C, there are shown a core 140 and a breaded sleeve 150. For example, the core can be placed inside the braided sleeve to define the shape of the rim.

For example, the core systems shown in FIGS. 5-7 can be placed inside a breaded sleeve to define the shape of the rim.

For example, the core can be made of wax, foam, bladder or any combination thereof. The core can be made of any other suitable materials. The core can be made of a material that can be melted, such as wax. The core can have a substantially circular cross section. The core can have an annular shape. The core can have a substantially frustum cross section.

For example, the braided sleeve can be bi-axial. For example, the braided sleeve can be tri-axial. The braided sleeve can be made out of composite fibers including carbon, glass, aramid, natural fibers, Kevlar™ Vectran™, Innegra™. For example, the braided sleeve can include composite fibers. The braided sleeves can be resin-free. The braided sleeve can include composite fibers. The braided sleeve can include dry fibers. For example, the dry fiber can be resin-free.

For example, placing the braided sleeve on the core can include placing the braided sleeve having dry fibers on the core. For example, placing the braided sleeve on the core can include placing the braided sleeve that is resin free on the core.

For example, placing the braided sleeve on a core can include inserting a first reinforcing layer on the core at a first location on the core.

For example, when placing the braided sleeve on the core, the method can include placing the braided sleeve on the core that has a reinforcing layer connected thereto so as to sandwich the reinforcing layer between the braided sleeve and the core. For example, the reinforcing layer can be disposed on an innermost surface of the core. As of another example, the reinforcing layer can be disposed on an outermost surface of the core.

For example, the core can include two reinforcing layers connected thereto. For example, a first reinforcing layer can be disposed on an innermost surface of the core and a second reinforcing layer can be disposed on an outermost surface of the core. The first reinforcing layer can be connected to the innermost surface of the core so as to prepare a precursor of a spoke bed. The second reinforcing layer can be connected to the outermost surface of the core so as to prepare a precursor of a rim bed.

Multiple techniques are used to maintain reinforcing layers on the core. For example, a reinforcing layer can be bonded to the core by an adhesive. For example, a reinforcing layer can be maintained on the core by a rope that wraps around the core.

For example, the first reinforcing layer and the second reinforcing layer are bonded to the core with by an adhesive. For example, the first reinforcing layer and the second reinforcing layer can be maintained on the core by a rope that wraps around the core and in-between the yarns. For example, the rope can be made of spandex.

The reinforcing layers can be made of suitable materials. For example, the reinforcing layer can be made of unidirectional fabrics, woven fabrics, braided reinforcements, folded sleeves, stitched reinforcements, unidirectional strands or any combination thereof. For example, the reinforcing layer can be made of unidirectional carbon fibers, woven carbon fibers, braided carbon fibers, folded carbon sleeves, stitched carbon sleeves, woven fabrics, unidirectional carbon strands or any combination thereof.

For example, the reinforcing layer can create an inner or outer hoop on the core.

For example, the first reinforcing layer and the second reinforcing layer can include unidirectional fabrics, woven fabrics, braided reinforcements, folded sleeves, stitched reinforcements, unidirectional strands or any combination thereof.

For example, the first reinforcing layer and the second reinforcing layer can include unidirectional carbon fibers, woven carbon fibers, braided carbon fibers, folded carbon sleeves, stitched carbon sleeves, woven fabrics, unidirectional carbon strands or any combination thereof.

For example, the first reinforcing layer creates an inner hoop on the core that is strong enough to withstand tension of spokes that are connectable thereto while ensuring overall stiffness of the rim in compression and flexion; and the second reinforcing layer creates an outer hoop on the core.

For example, the first reinforcing layer and/or the second reinforcing layer can include dry fibers that are resin-free.

For example, multiple braided sleeves can be assembled on the core. For example, assembling braided sleeves on the core can include: assembling a first set of sleeves to configure the interior shape; assembling a second set of sleeves to configure the exterior shape; assembling a third set of sleeves to configure a rim beds; and assembling a fourth set of sleeves to configure a spoke nipple beds.

For example, assembling the braided sleeves on the core can include assembling a first set of sleeves to configure the interior shape; assembling a second set of sleeves to configure the exterior shape; assembling a third set of sleeves to configure a rim beds; and assembling a fourth set of sleeves to configure a spoke nipple beds.

For example, the braided sleeve can be stitched on itself to shape a hook portion of the rim. For example, the braided sleeve can be folded on itself before being stitched. For example, the hook portion can include one wall on each side of the rim.

The hook portion of the rim can be preformed in the mold. The hook portion of the rim can be preformed with the use of a binder.

Referring back to FIG. 9A, the braided sleeve placed on the core is inserted inside a mold 91. The mold 91 is dimensioned to define a shape of an external wall shape of the rim. The mold 91 includes an upper portion 97 and a lower portion 96 or more. As shown in FIG. 9A, there is a gap 103 between the upper portion 97 and the lower portion 96.

Figure 10:
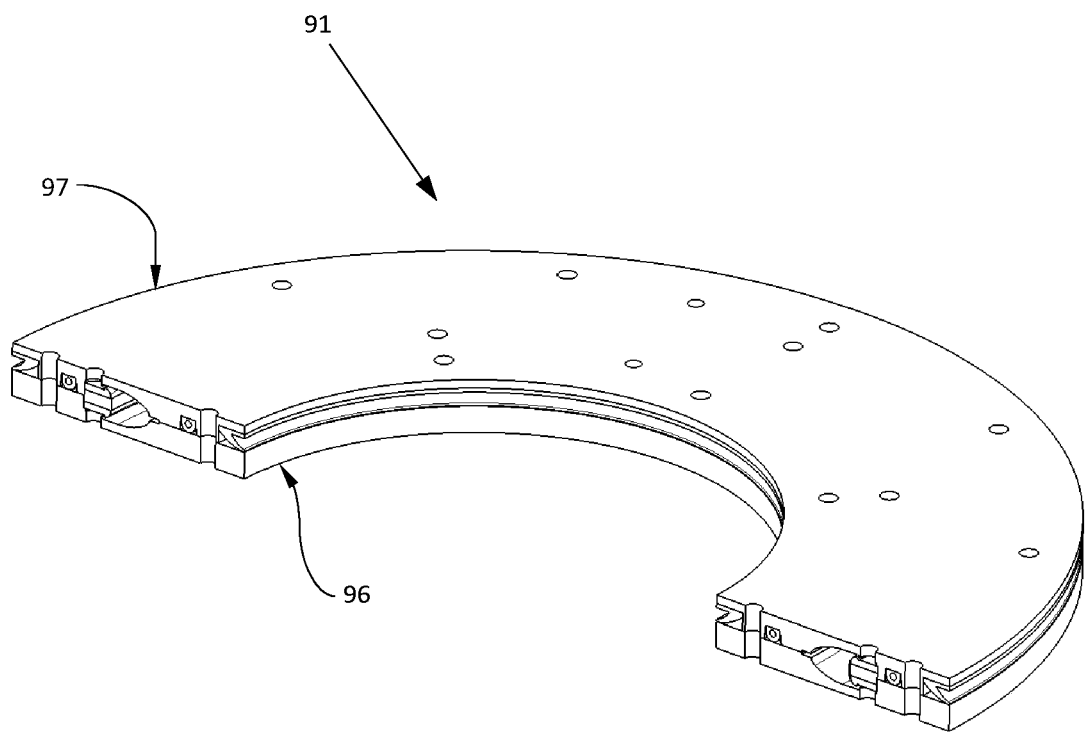
FIG. 10 illustrates a cross section view of a mold according to one example.
Figure 12:
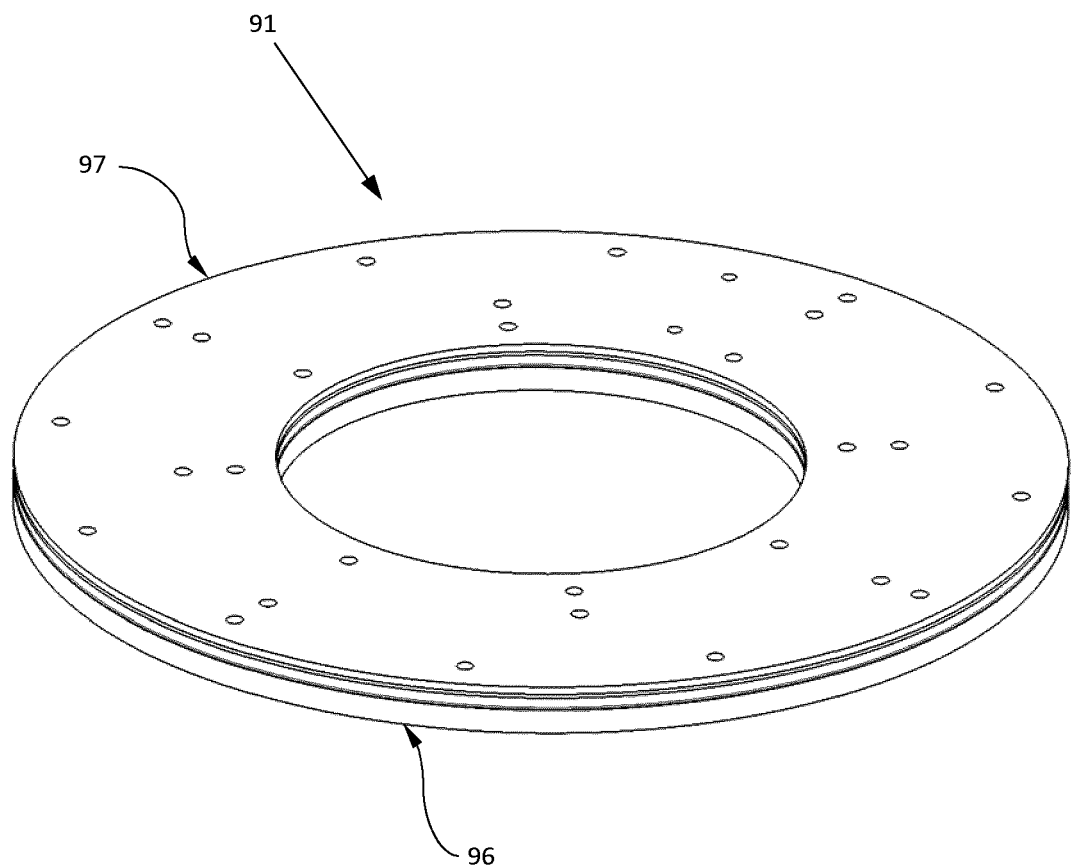
FIG. 12 illustrates a perspective view of a mold according to one example.

Referring now to FIG. 10, there is shown a cross section view of the mold 91, including the upper portion 97 and lower portion 96. Referring now to FIG. 12, there is shown a perspective view of the mold 91, including the upper portion 97 and lower portion 96.

Figure 11:
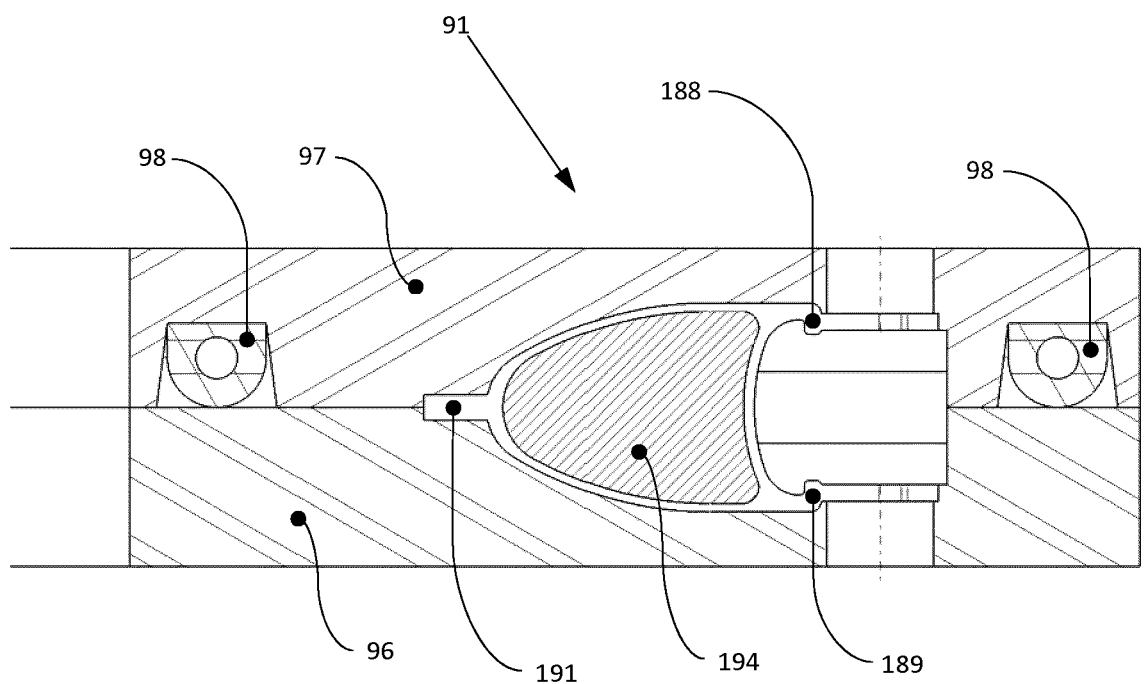
FIG. 11 illustrates a cross section view of a mold according to one example.

Referring to FIG. 11, there is shown cross section view of the inside cavity 191 of the mold 91. The mold 91 is fully closed and the upper portion 97 is fitted into the lower portion 96. The inside cavity can be vacuumed before the resin injection. The inside cavity can be isolated from the outside by seals 98. The inside cavity of the mold is adapted to receive a core 194 with mounted layers (not shown) to produce a rim when resin is injected into the mounted layers of the core 194. For example, hooks can be defined on the rim by the hook-shape portions 188 and 189 of the upper portion 97 and lower portion 96 when the mold is fully closed and resin is injected into the core 194 with mounted layers.

For example, after the resin is injected and cured inside the cavity containing the core and mounted layers, the rim will take the shape of the inside cavity. As the portion 188 and 189 are shaped as hooks, the external surface of the rim will take such shape. Thus, the hook-shaped portions 188 and 189 of the mold are configured to shape the hooks on the external surface of the rim.

For example, layers (such as braided sleeve) mounted on the core can be stitched on themselves to shape a hook portion. When the core is inside the mold, such hook portion will be completed by the hook-shaped portions 188 and 189.

Referring back to FIG. 9A, the cavity inside the mold is isolated from the outside with seals 98. Air inside the cavity is vacuumed before the resin is injected. For example, the cavity can be under vacuum. As shown in FIG. 9A, there is gap 107 between the braided sleeve 101 and the upper portion of the mold 97. For example, the purpose of the gap is to make it easier for the resin to flow around and impregnate all the fibers inside the cavity and on the core. For example, if the mold was completely closed and then the resin was injected, it would need more pressure to force the resin to flow everywhere. It is also possible to do it this way (which is called RTM—Resin transfer molding)

As shown in FIG. 9B, resin 92 is injected inside the mold to contact the mold and impregnate the fibers with the resin. For example, the resin injected into the mold 91 by the pressure pot 94. For example, the resin can be injected into the mold at a pressure of around 50 psi. The resin leaves the pressure pot 94, travels through to conduit 95, and enters the mold 91 through the inlet 99 which is connected to conduit 95. A valve on conduit 111 prevents the resin from going to the resin retention pot 113 and to the vacuum pump.

As shown in FIG. 9B, the resin fills into the mold 91. For example, the resin now occupies the space 107, which was empty as shown in FIG. 9A. The resin goes through the braided sleeve inside the mold. Injecting resin inside the mold can include leaving a small gap in the closure of the mold.

For example, the resin can be injected inside the mold while it is closed. Advantages of using this method includes having a faster cycle for the molding process and the injection time. Using this process, less resin is used and there is less risk of resin leakage.

According to another example, the resin can be injected inside the mold while leaving a small gap in the closure of the mold. For example, the gap can be a predetermined opening of the closure of the mold. Leaving such gap can allow ease of the impregnation of the braided sleeves. For example, the gap can be configured such that it does not affect the curing process. The resin cures after it has been injected inside the mold and the cavity has been filled.

As shown in FIG. 9B, the resin is injected inside the mold while leaving a small gap in the closure of the mold. For example, the gap can be between 1-20 mm. For example, the mold can be half closed to leave a small gap to ease the impregnation of the braided sleeves. As shown in FIG. 9B, the vacuum seals 98 isolates the cavity from the outside. For example, to isolate the cavity from the outside, a gap can be created by a hydraulic press that pushes and holds the top part of the mold 97 on the bottom part of the mold 96, but not completely.

Once the mold is full of resin, the mold is fully closed to allow the excess resin to get out and the braided sleeve is fully cured. Once the mold is fully closed, the mold can be heated.

Referring to FIG. 9C, the mold is fully closed. As a result, there is no more gap maintained by the vacuum seal and the impregnation of the fibers is optimal. For example, the resin can move back to the pressure pot because of excess of resin into the mold cavity. For example, closing the mold can force this excess resin to get out of the mold cavity and go to the pressure pot.

As shown in FIG. 9C, the resin is being cured. For example, the braided sleeve and the other fibers have been impregnated with resin and the resin is cured to form the internal and external walls of the rim. Also, the resin is cured to obtain a cured rim having the core connected thereto.

The mold is adapted to shape the hook on the external surface of the rim.

Once the resin has been fully cured, the cured rim and core can be removed from the mold.

After that, the method includes melting the fusible core or removing the solid core. For example, melting the core can include building a hole on an outer surface of the cured rim to access the core and heating the cured rim to melt the core, wherein the core leaves the molded rim through the hole.

According to another example, a method of manufacturing a rim includes placing at least a first braided sleeve on a core dimensioned to define the shape of the internal wall of the rim. At least a second braided sleeve is placed on the first braided sleeve to shape a hook portion of the rim. The first braided sleeve placed on the core and the second braided sleeve are inserted inside a mold that is dimensioned to define a shape of an external wall shape of the rim. A resin is injected inside the mold to contact the mold and impregnate the first braided sleeve and the second braided sleeve. The resin is cured to form the internal and external walls of the rim and the hook of the rim. A cured rim is obtained. For example, the cured rim has the core connected thereto. After that, the cured rim and the core are removed from the mold. Then, the core is removed from the cured rim. For example, the core can be removed using the same techniques described in this disclosure.

According to a further example, a method of manufacturing a rim includes placing at least one first braided sleeve on a core dimensioned to define the shape of the internal wall of the rim. The method also includes inserting the first braided sleeve placed on the core inside a mold that is dimensioned to define a shape of an external wall shape of the rim. The method further includes placing at least a second braided sleeve on the first braided sleeve to shape a hook portion of the rim. Further, the method includes injecting a resin inside the mold to contact the mold and impregnate the first braided sleeve and the second braided sleeve with the resin. Furthermore, the method includes curing the resin to form the internal and external walls of the rim and the hook of the rim and obtain a cured rim having the core connected thereto. After that, the cured rim and core are removed from the mold. Then, the core is removed. For example, the core can be removed using the same techniques described in this disclosure.

Figure 13:
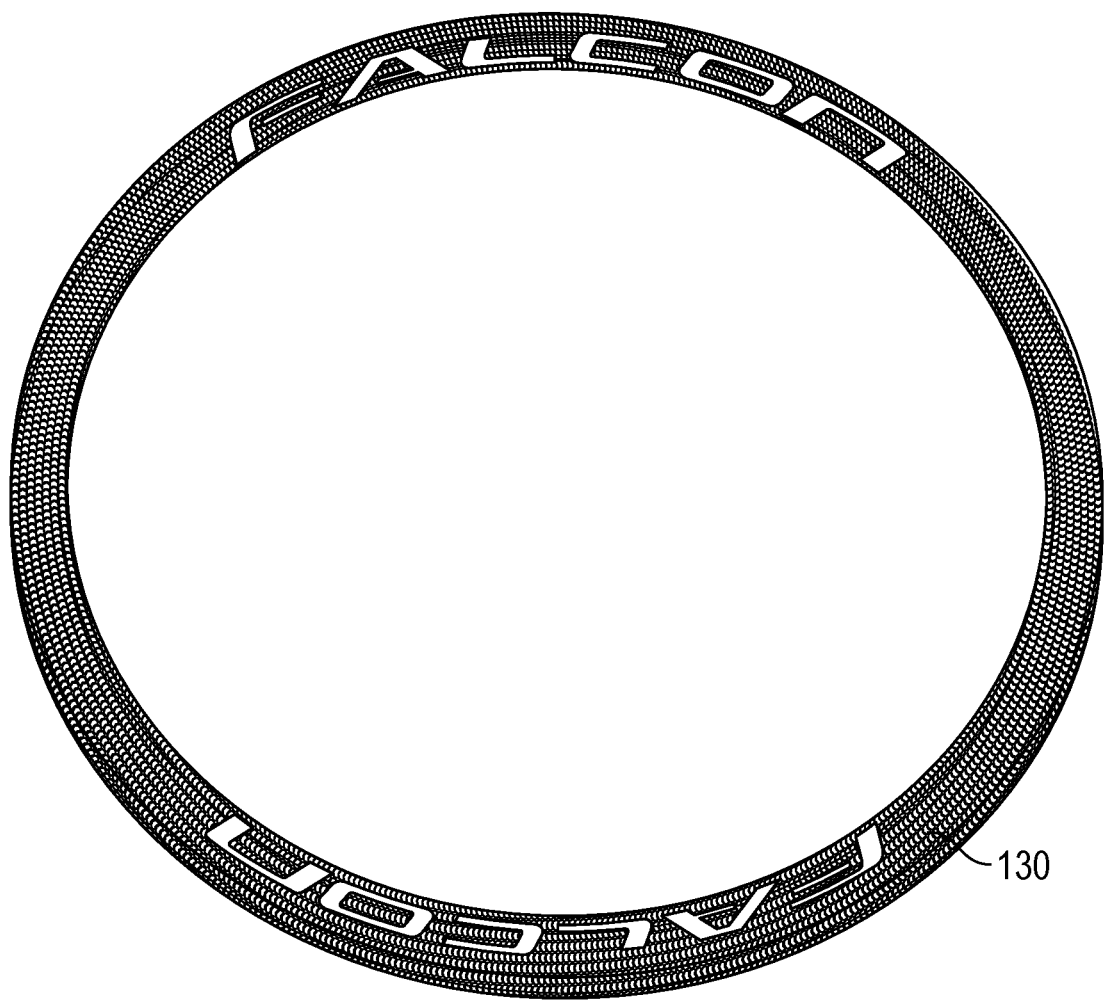
FIG. 13 illustrates a perspective view of a rim according to one example.

As shown in FIG. 13, a bicycle rim can include an external wall molded in a single unitary continuous piece. For example, the external wall is the outer surface of the braided sleeve impregnated with resin itself. The external wall can define a hook dimensioned for holding a bicycle tubeless tire. FIG. 10, 11, 12 show possible designs of the mold. For example, the cavity, which is the shape of the rim, can be seen on the cutaway of the mold on FIG. 11.

For example, a bicycle rim can include a first external wall molded in a single unitary continuous piece that defines a portion of the bicycle rim and a second external wall molded in a single unitary continuous piece that defines a hook portion dimensioned for holding a bicycle tubeless tire, a clincher tire or a tubular tire, said first external wall and said second external wall are connected together.

Figure 17:
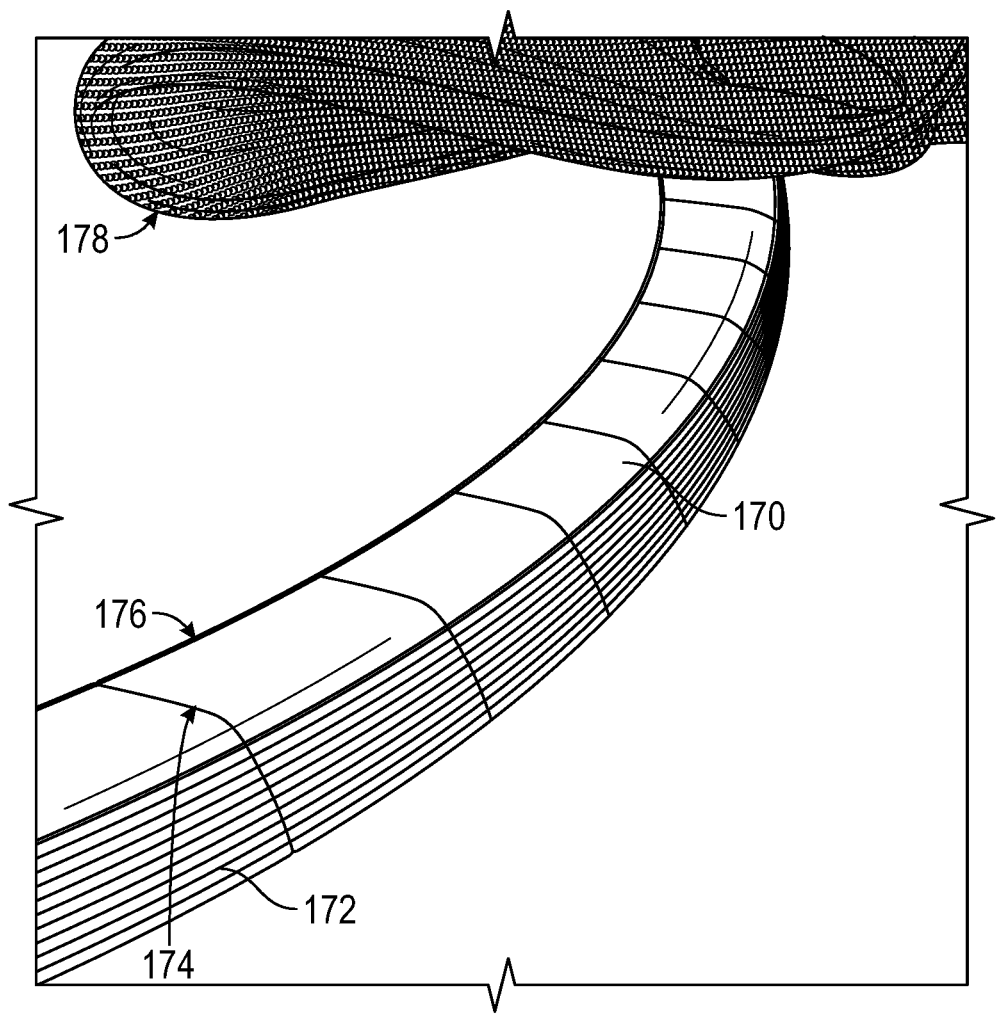
FIG. 17 illustrates a perspective view of a core on which layers are mounted according to one example.

Referring to FIG. 17, there is shown a core system. The core system includes a core 170. The core can be a core. The core can be made of the same materials as previously described.

There are reinforcing layers connected to the core 170. A reinforcing layer 172 is connected to the core 170. The reinforcing layer 172 can be a rim bed. A reinforcing layer 176 is connected to the core 170. The reinforcing layer 176 can be a spokes bed.

As shown on FIG. 17, the reinforcing layers 172 and 176 are maintained on the core 170 by a rope 174 that wraps around reinforcing layers and the core 170. The rope 170 maintains the reinforcing layers in position on the core. The rope 174 can be made of spandex.

Other techniques can be used to maintain the reinforcing layers on the core. For example, the reinforcing layer can be bonded to the core by an adhesive.

As shown in FIG. 17, there is a braided sleeve 178. The braided sleeve can be placed on the core system. For example, the braided sleeve can be placed on the core system that has reinforcing layers connected thereto so as to sandwich the reinforcing layers between the braided sleeve and the core.

The embodiments of the paragraphs of the present disclosure are presented in such a manner in the present disclosure so as to demonstrate that every combination of embodiments, when applicable can be made. These embodiments have thus been presented in the description in a manner equivalent to making dependent claims for all the embodiments that depend upon any of the preceding claims (covering the previously presented embodiments), thereby demonstrating that they can be combined together in all possible manners. For example, all the possible combinations, when applicable, between the embodiments of any paragraphs and the methods and rims of the summary are hereby covered by the present disclosure.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A method of manufacturing a rim, comprising:
placing at least one braided sleeve on a fusible core, the braided sleeve comprising dry fibers that are resin-free, the braided sleeve being dimensioned to define a shape of an internal wall of the rim;
inserting the braided sleeve having the fusible core into a mold that is dimensioned to define a shape of an external wall of the rim, the mold being adapted to shape a hook portion of the rim, the braided sleeve being folded on itself to form the hook portion;
injecting a resin inside the mold to contact the mold and impregnate the at least one braided sleeve with the resin;
curing the resin to form the internal and external walls of the rim and obtain a cured rim having the fusible core connected thereto;
removing the cured rim and fusible core from the mold; and
removing the fusible core.

2. The method of claim 1, wherein placing said at least one braided sleeve on said fusible core comprises placing said at least one braided sleeve on said fusible core that has at least one reinforcing layer connected thereto so as to sandwich said reinforcing layer between said braided sleeve and said fusible core.

3. The method of claim 2, wherein said at least one reinforcing layer is disposed on an innermost surface of said fusible core.

4. The method of claim 2, wherein said at least one reinforcing layer is disposed on an outermost surface of said fusible core.

5. The method of claim 2, wherein said fusible core comprises two reinforcing layers connected thereto, a first reinforcing layer being disposed on an innermost surface of said fusible core and a second reinforcing layer disposed on an outermost surface of said fusible core.

6. The method of claim 5, further comprising
connecting said first reinforcing layer to said innermost surface of said fusible core so as to prepare a precursor of a spoke bed; and
connecting said second reinforcing layer to said outermost surface of said fusible core so as to prepare a precursor of a rim bed.

7. The method of claim 5, wherein said first reinforcing layer and said second reinforcing layer comprise at least one of unidirectional carbon fibers, woven carbon fibers, braided carbon fibers, folded carbon sleeves, stitched carbon sleeves, woven fabrics, unidirectional carbon strands or any combination thereof.

8. The method of claim 5, wherein
said first reinforcing layer creates an inner hoop on the fusible core that is strong enough to withstand tension of spokes that are connectable thereto while ensuring overall stiffness of the rim in compression and flexion; and said second reinforcing layer creates an outer hoop on the fusible core.

9. The method of claim 2, wherein said at least one reinforcing layer is bonded to said fusible core by an adhesive.

10. The method of claim 2, wherein said at least one reinforcing layer is maintained on the fusible core by a rope that wraps around said fusible core.

11. The method of claim 2, wherein said at least one reinforcing layer is maintained on the fusible core by a rope that wraps around said fusible core and in-between fiber yarns.

12. The method of claim 2, wherein said at least one reinforcing layer creates an inner or outer hoop on the fusible core.

13. The method of claim 1, wherein the at least one braided sleeve is folded on itself and then stitched to form the hook portion.

14. The method of claim 13, wherein the hook portion comprises one wall on each side of the rim.

15. The method of claim 1, wherein placing the at least one braided sleeve comprising dry fibers on the fusible core comprises:
assembling a first set of sleeves on the fusible core to define an interior shape of the rim;
assembling a second set of sleeves on the fusible core to define an exterior shape of the rim;
assembling a third set of sleeves on the fusible core to define a rim bed;
assembling a fourth set of sleeves on the fusible core to define a spoke nipple bed.

16. A method of manufacturing a rim, comprising:
injecting a resin inside a mold, the mold comprising at least one braided sleeve on a fusible core, the braided sleeve comprising dry fibers that are resin-free, the braided sleeve being dimensioned to define a shape of an internal wall of the rim, the mold being dimensioned to define a shape of an external wall of the rim, the mold being adapted to shape a hook portion of the rim, the braided sleeve being folded on itself to form the hook portion, the injecting being carried out to contact the mold and impregnate the at least one braided sleeve with the resin;
curing the resin to form the internal and external walls of the rim and obtain a cured rim having the fusible core connected thereto;
removing the cured rim and fusible core from the mold; and
removing the fusible core.

17. The method of claim 16 comprising, placing the at least one braided sleeve on the fusible core dimensioned to define the shape of the internal wall of the rim; and inserting the braided sleeve placed on the fusible core inside the mold that is dimensioned to define the shape of the external wall of the rim.

18. The method of claim 16 comprising, inserting the fusible core inside the mold that is dimensioned to define the shape of the external wall of the rim; and placing the at least one braided sleeve on the fusible core dimensioned to define the shape of the internal wall of the rim.

* * * * *